United States Patent
Khalid et al.

(10) Patent No.: US 12,009,771 B1
(45) Date of Patent: Jun. 11, 2024

(54) DOUBLY FED INDUCTION GENERATOR SPEED CONTROL SYSTEM AND METHOD FOR CONTROLLING THE SYSTEM

(71) Applicant: KING FAHD UNIVERSITY OF PETROLEUM AND MINERALS, Dhahran (SA)

(72) Inventors: Muhammad Khalid, Dhahran (SA); Mohammad Ali, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/178,207

(22) Filed: Mar. 3, 2023

(51) Int. Cl.
*H02P 9/00* (2006.01)
*H02J 3/38* (2006.01)
*H02P 101/15* (2016.01)

(52) U.S. Cl.
CPC .............. *H02P 9/007* (2013.01); *H02J 3/381* (2013.01); *H02J 2300/28* (2020.01); *H02P 2101/15* (2015.01)

(58) Field of Classification Search
CPC ...... H02P 9/007; H02P 2101/15; H02J 3/381; H02J 2300/28
See application file for complete search history.

(56) References Cited

U.S. PATENT DOCUMENTS

2022/0010773 A1* 1/2022 Thurlow .................. H02P 9/06

FOREIGN PATENT DOCUMENTS

CN 105119318 B 7/2017

OTHER PUBLICATIONS

Muhammad Maaruf, et al., "Adaptive Nonsingular Fast Terminal Sliding Mode Control for Maximum Power Point Tracking of a WECS-PMSG", Sustainability, vol. 13, Issue 23, Article No. 13427, Dec. 3, 2021, pp. 1-19.

Orlando Soares, et al., "Nonlinear control of the doubly-fed induction generator in wind power systems", Renewable Energy, vol. 35, 2010, pp. 1662-1670.

Yashar Mousavi, et al., "Active Fault-tolerant Fractional-order Terminal Sliding Mode Control for DFIG-based Wind Turbines Subjected to Sensor Faults", IEEE IAS Global Conference on Emerging Technologies (GlobConET), 2022, pp. 1-15.

(Continued)

*Primary Examiner* — Viet P Nguyen
(74) *Attorney, Agent, or Firm* — Oblon, McClelland, Maier & Neustadt, L.L.P.

(57) ABSTRACT

A doubly fed induction generator (DFIG) speed control system is provided. The system includes a wind turbine and a wound rotor induction generator connected to the wind turbine through a drive train system and to a power grid. The system further includes a back-to-back voltage source converter (VSC) with a rotor side converter (RSC) and a grid side converter (GSC). The RSC is connected to the wound rotor induction generator and the GSC is connected to the power grid. A wind profile sensor measures a wind profile and a VSC controller provides control to the RSC and the GSC. The VSC controller applies a nonsingular fast terminal sliding mode control (NSFTSMC) scheme at the RSC at least partially based on the received wind profile to stabilize a rotor speed of the wound rotor induction generator.

18 Claims, 15 Drawing Sheets

(56) References Cited

OTHER PUBLICATIONS

Jianing Fu, et al., "Nonsingular fast terminal control for the DFIG-based variable-speed hydro-unit", Energy, vol. 244, Part A, Article No. 122672, Apr. 1, 2022, 8 pages (Abstract only).
Hamid Chojaa, et al., "Integral sliding mode control for DFIG based WECS with MPPT based on artificial neural network under a real wind profile", Energy Reports, vol. 7, 2021, pp. 4809-4824.
E. Aydin, et al., "Vector Control of DFIG in Wind Power Applications", 5th International Conference on Renewable Energy Research and Applications (ICRERA), Nov. 20-23, 2016, pp. 478-483.
N. Bounar, et al., "PSO-GSA based fuzzy sliding mode controller for DFIG-based wind turbine", ISA Transactions, vol. 85, 2019, pp. 177-188.

* cited by examiner

DOUBLY FED INDUCTION GENERATOR SPEED CONTROL SYSTEM AND METHOD FOR CONTROLLING THE SYSTEM

BACKGROUND

Technical Field

The present disclosure is directed to wind turbines, and particularly, to doubly fed induction generator speed control systems of the wind turbines and methods of controlling the system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Deregulation of energy and environmental pollution has enhanced the focus of the research on reliable control of alternative non-conventional electrical power sources [Necoechea-Porras, P. D., López, A., Salazar-Elena, J. C. (2021) 'Deregulation in the Energy Sector and Its Economic Effects on the Power Sector: A Literature Review', Sustainability, 13(6), 3429, available: dx.doi.org/10.3390/su13063429]. Wind energy based systems are alternatives employed to generate bulk power, and squirrel-cage type and wound rotor type induction machines are employed for the same. A wound rotor is more preferred as the machine can be controlled through low-power power conversion devices through the rotor side. These machines are also known as doubly-fed induction generators (DFIG). Proper rotor speed control of the induction generators is required for reliable operation of the DFIG.

Wind turbine-generator concepts and control strategies have been developed to overcome wind and grid side intermittencies [Li, H. and Chen, Z. (2008), "Overview of Different Wind Generator Systems and their Comparison", JET Renewable Power Generation, Vol. 2, No. 2, pp. 123-138; Boukhezzar, B. and Siguerdidjane, H. (2011), "Nonlinear Control of a Variable-Speed Wind Turbine Using a Two-Mass Model", IEEE Transactions on Energy Conversion, Vol. 26, No. 1, pp. 149-162]. The control schemes have changed from conventional PI to nonlinear control, as it is much nearer in accuracy with the actual system [Elkington, K. and Ghandhari, M (2009), "Comparison of Reduced Order Doubly Fed Induction Generator Models for Nonlinear Analysis", IEEE Electrical Power & Energy Conference, pp. 1-6; Hu, J., Nian, H., Hu, B., He, Y, Zhu, Z. Q. (2010), "Direct Active and Reactive Power Regulation of DFIG Using Sliding-Mode Control Approach", IEEE Transactions on Energy Conversion, Vol. 25, No. 4, pp. 1028-1039]. Implementation of modern control schemes has become viable due to developments in microprocessor and semiconductor technology [Abu-Rub, H., Malinowski, M. and Al-Haddad, K. (2014) "Power Electronics for Renewable Energy Systems, Transportation and Industrial Applications.", 1st ed. Wiley. doi: 10.1002/9781118755525]. Out of the wind turbine generator system configurations, the doubly fed induction generator (DFIG) comprises of approximately 55% of the total systems. The main reasons being the variable speed range of ±30% of synchronous speed and that the converter ratings are of slip power rating. This leads to high energy yield and lower component stress [Bou-Rabee, M., Lodi, K. A., Ali, M, Ansari, M. F., Tariq, M., Sulaiman, S. A. (2020), "One-month-ahead wind speed forecasting using hybrid AI model for coastal locations", IEEE Access, 8, pp. 198482-198493. doi: 10.1109/ACCESS. 2020. 3028259].

Field oriented control (FOC) and other [Ayedin, E., Polat, A. and Ergene, L. T. (2016) "Vector control of DFIG in wind power applications", in ICRERA-2016, pp. 478-483. doi: 10.1109/ICRERA.2016.7884383] vector control techniques are employed to control the DFIG power electronics and permit more efficient control of the machine speed. Stator flux-oriented-FOC has been used extensively [Qiao, W., Zhou, W., Aller, J. M. and Harley, R. G. (2008), "Wind Speed Estimation Based Sensorless Output Maximization Control for a Wind Turbine Driving a DFIG", IEEE Transactions on Power Electronics, Vol. 23, No. 3, pp. 1156-1169], where the current component (q-axis) controls the active power, and the d-axis is employed to control the reactive power. While, in the stator voltage oriented-FOC, a contrary structure is used [Subudhi, B. and Ogeti, P. S. (2018) 'Optimal preview stator voltage-oriented control of DFIG WECS', JET Generation, Transmission and Distribution, 12(4), pp. 1004-1013. doi: 10.1049/iet-gtd.2016.2027]. Proportional-Integral (PI) controllers are commonly used in these schemes. The PI controller applies a error correction function based on proportional and integral terms, where the error is the difference between a desired result and a measured result.

On the other hand, the sliding mode control (SMC) is a variable structure control technique in which an unstable system varies between the two structures using SMC to make the overall performance of the system stable [Utkin, V., Guldner, J., & Shi, J. (2017). "Sliding Mode Control in Electro-Mechanical Systems (2nd ed.)", CRC Press. doi.org/10.1201/9781420065619 incorporated herein by reference]. In addition, the switching between the two structures equips the controller with invariance property against model uncertainties and disturbances. Besides, the SMC method is easy to construct, achieves faster convergence, smooth response, better steady-state behavior, and easy to guarantee the finite-time stability of the system in theory [Chojaa, H., Derouich, A., Chehaidia, S. E., Zamzoum, O., Taoussi, M., & Elouatouat, H. (2021), "Integral sliding mode controlfor DFIG based WECS with MPPT based on artificial neural network under a real wind profile", Energy Reports, 7, 4809-4824; Amrr, S. M., Ahmad, J., Waheed, S. A., Sarwar, A., Saidi, A. S., & Nabi, M. (2022), "Finite-Time Adaptive Sliding Mode Control of a Power Converter Under Multiple Uncertainties", Frontiers in Energy Research, 580]. However, in practical scenario, achieving a finite time result with absolute zero error convergence is unrealistic. Therefore, recently, new results of practical finite time stability were presented [Zhu, Z., Xia, Y., & Fu, M. (2011). Attitude stabilization of rigid spacecraft with finite-time convergence. International Journal of Robust and Nonlinear Control, 21(6), 686-702.; Fu, C., Wang, Q. G., Yu, J., & Lin, C. (2021). Neural network-based finite-time command filtering controlfor switched nonlinear systems with backlash-like hysteresis. IEEE Transactions on Neural Networks and Learning Systems, 32(7), 3268-3273; Amrr, S. M., & Nabi, M. (2020). "Finite-time fault tolerant attitude tracking control of spacecraft using robust nonlinear disturbance observer with anti-unwinding approach", Advances in Space Research, 66(7), 1659-1671]. Here, the closed loop signals converge to a small residual bound about zero within finite time.

Each of the aforementioned references suffers from one or more drawbacks hindering their adoption. Accordingly, it is one object of the present disclosure to provide a control scheme that facilitates less speed fluctuation. Further, it is an object of the present disclosure to enhance the DFIG performance by gaining more mechanical stability and suppression of speed fluctuations. In one aspect of the present disclosure, nonsingular fast terminal sliding mode control (NSFTSMC) [Yang, L., & Yang, J. (2011), *"Nonsingular fast terminal sliding-mode control for nonlinear dynamical systems,"* International Journal of Robust and Nonlinear Control, 21(16), 1865-1879—incorporated herein by reference] to track the angular speed in the speed loop of the rotor side vector control of the DFIG.

SUMMARY

In an exemplary embodiment, a doubly fed induction generator (DFIG) speed control system is described. The system includes a wind turbine and a wound rotor induction generator configured to connect with the wind turbine through a drive train system. The wound rotor induction generator is further configured to connect to a power grid. The system further includes a back-to-back voltage source converter (VSC) with a rotor side converter (RSC) and a grid side converter (GSC). The RSC is connected to the wound rotor induction generator and the GSC is connected to the power grid. The system further includes a wind profile sensor configured to measure a wind profile and a VSC controller configured to provide control to the RSC and the GSC. The VSC controller is configured to apply a nonsingular fast terminal sliding mode control (NSFTSMC) scheme at the RSC at least partially based on the received wind profile to stabilize a rotor speed of the wound rotor induction generator 20%±10% faster than a conventional PI controller.

In some embodiments, the drive train system includes a low-speed shaft, a high-speed shaft, and a gearbox.

In some embodiments, the nonsingular fast terminal sliding mode control (NSFTSMC) scheme is expressed as:

$$u = -\frac{a_1}{b}x_2 - \frac{|x_2|^{2-\xi_2}\text{sign}(x_2)}{bc_2\xi_2}(x_2 + c_1\xi_1|x_1|^{\xi_1-1}x_2) - \alpha_1 s - \alpha_2|s|^{\beta}\text{sign}(s)$$

where u is the control input, $$a_1 = -\frac{B}{J}, b = \frac{k_t k_1}{J},$$

where B is the friction coefficient, J is the moment of inertia, $k_t$ and $k_1$ are gain constants, $\alpha_1 > 0$, $\alpha_2 > 0$, and $\beta \in (0,1)$ is the pitch angle;

$x_1$ is a first order mechanical dynamic equation $x_1 = \theta^*_r - \theta_r$ where $\theta^*_r$ is the desired angular position and $\theta_r$ is the angular position of the wind turbine;

$x_2$ is a second order mechanical dynamic equation $$x_2 = -(T_e - T_L)\frac{1}{Js+B}$$

where $T_L$ is the disturbance load torque and $T_e$ is the electromechanical control torque; and s is the nonsingular fast terminal sliding surface (NSFTSS) expressed as:

$$s = x_1 + c_1|x_1|^{\xi_1}\text{sign}(x_1) + c_2|x_2|^{\xi_2}\text{sign}(x_2),$$

where $c_1$ and $c_2$ are positive coefficients of NSFTSS $s \in \mathbb{R}$, and $\xi_1$ and $\xi_2$ are the auxiliary state variables of observer where $\xi_2 \in (1, 2)$ and $\xi_1 > \xi_2$.

In some embodiments, the RSC is an AC-to-DC converter and the GSC is a DC-to-AC converter.

In some embodiments, the base speed is 1.2 times a synchronous speed of the wound rotor induction generator.

In some embodiments, the measured wind profile includes at least a wind speed.

In another exemplary embodiment, a method for controlling a doubly fed induction generator (DFIG) speed control system is described. The method includes measuring a wind profile and applying a nonsingular fast terminal sliding mode control (NSFTSMC) scheme to the DFIG speed control system. The DFIG speed control system is configured to include a wind turbine and a wound rotor induction generator configured to connect with the wind turbine through a drive train system and connect to a power grid. The system further includes a back-to-back voltage source converter (VSC) with a rotor side converter (RSC) and a grid side converter (GSC). The RSC is connected to the wound rotor induction generator and the GSC is connected to the power grid. The system further includes a VSC controller. The NSFTSMC scheme is applied to stabilize a rotor speed of the wound rotor induction generator to a base speed and to achieve a shorter stabilizing time than a conventional proportional integral controller.

In some embodiments, the base speed is 1.2 times a synchronous speed of the wound rotor induction generator.

In some embodiments, the method further includes applying an electrical control scheme to the GSC and applying a rotor blade control scheme to the wind turbine to control a pitch of rotor blades of the wind turbine.

In some embodiments, the drive train system in the DFIG based wind turbine further includes a low-speed shaft, a high-speed shaft and a gearbox.

In some embodiments, the nonsingular fast terminal sliding mode control (NSFTSMC) scheme is expressed as:

$$u = -\frac{a_1}{b}x_2 - \frac{|x_2|^{2-\xi_2}\text{sign}(x_2)}{bc_2\xi_2}(x_2 + c_1\xi_1|x_1|^{\xi_1-1}x_2) - \alpha_1 s - \alpha_2|s|^{\beta}\text{sign}(s),$$

where u is the control input, $$a_1 = -\frac{B}{J}, b = \frac{k_t k_1}{J},$$

where B is the friction coefficient, J is the moment of inertia, $k_t$ and $k_1$ are gain constants, $\alpha_1 > 0$, $\alpha_2 > 0$, and $\beta \in (0,1)$ is the pitch angle;

$x_1$ is a first order mechanical dynamic equation $x_1 = \theta^*_r - \theta_r$ where $\theta^*_r$ is the desired angular position and $\theta_r$ is the angular position of the wind turbine;

$x_2$ is a second order mechanical dynamic equation $$x_2 = -(T_e - T_L)\frac{1}{Js+B}$$

where $T_L$ is the disturbance load torque and $T_e$ is the electromechanical control torque; and s is the nonsingular fast terminal sliding surface (NSFTSS) expressed as:

$$s = x_1 + c_1|x_1|^{\xi_1}\text{sign}(x_1) + c_2|x_2|^{\xi_2}\text{sign}(x_2),$$

where $c_1$ and $c_2$ are positive coefficients of NSFTSS $s \in \mathbb{R}$,, and $\xi_1$ and $\xi_2$ are the auxiliary state variables of observer where $\xi_2 \in (1, 2)$ and $\xi_1 > \xi_2$.

In some embodiments, the RSC is an AC-to-DC converter.

In some embodiments, the GSC is a DC-to-AC converter.

In some embodiments, the received wind profile includes at least a wind speed.

In yet another exemplary embodiment, a method for controlling a doubly fed induction generator (DFIG) speed control system is described. The method includes measuring a wind profile and applying a nonsingular fast terminal sliding mode control (NSFTSMC) to stabilize a rotor to a base speed and to achieve a shorter stabilizing time than a conventional proportional integral controller. The NSFTSMC scheme is expressed as:

$$u = -\frac{a_1}{b}x_2 - \frac{|x_2|^{2-\xi_2}\text{sign}(x_2)}{bc_2\xi_2}(x_2 + c_1\xi_1|x_1|^{\xi_1-1}x_2) - \alpha_1 s - \alpha_2|s|^\beta \text{sign}(s),$$

where u is the control input, $$a_1 = -\frac{B}{J}, b = \frac{k_t k_1}{J},$$

where B is the friction coefficient, J is the moment of inertia, $k_t$ and $k_1$ are gain constants, $\alpha_1 > 0$, $\alpha_2 > 0$, and $\beta \in (0,1)$ is the pitch angle;

$x_1$ is a first order mechanical dynamic equation $x_1 = \theta^*_r - \theta_r$ where $\theta^*_r$ is the desired angular position and $\theta_r$ is the angular position of the wind turbine;

$x_2$ is a second order mechanical dynamic equation $$x_2 = -(T_e - T_L)\frac{1}{Js + B}$$

where $T_L$ is the disturbance load torque and $T_e$ is the electromechanical control torque; and s is the nonsingular fast terminal sliding surface (NSFTSS) expressed as:

$$s = x_1 + c_1|x_1|^{\xi_1}\text{sign}(x_1) + c_2|x_2|^{\xi_2}\text{sign}(x_2),$$

where $c_1$ and $c_2$ are positive coefficients of NSFTSS $s \in \mathbb{R}$, and $\xi_1$ and $\xi_2$ are the auxiliary state variables of observer where $\xi_2 \in (1, 2)$ and $\xi_1 > \xi_2$.

In some embodiments, the DFIG speed control system is configured to include a wind turbine including a low-speed shaft, a high-speed shaft, and a gearbox. The system further includes a wound rotor induction generator configured to connect with the wind turbine through a drive train system and connect to a power grid. The system further includes a back-to-back voltage source converter (VSC) with a rotor side converter (RSC) and a grid side converter (GSC). The RSC is connected to the wound rotor induction generator and the GSC is connected to the power grid. The system further includes a VSC controller.

In some embodiments, the applying the NSFTSMC scheme is done by the VSC controller to the RSC.

In some embodiments, the RSC is an AC-to-DC converter, and the GSC is a DC-to-AC converter.

In some embodiments, the base speed is 1.2 times a synchronous speed of the wound rotor induction generator.

In some embodiments, the measured wind profile includes at least a wind speed.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
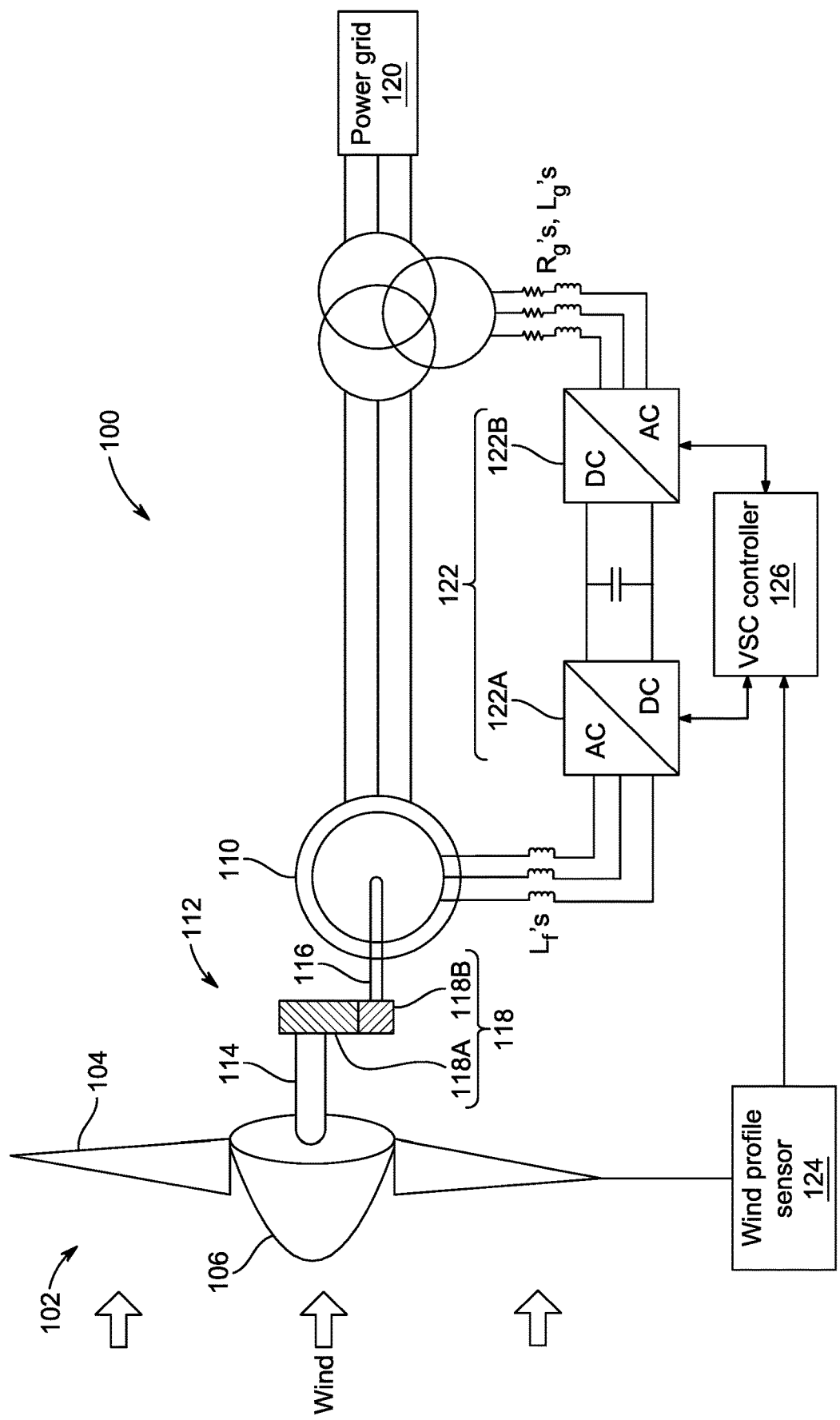
FIG. 1 is a schematic block diagram of a doubly fed induction generator (DFIG) based wind turbine generator system (DFIG-WTGS) and a speed control system associated with the DFIG, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of the present disclosure are directed to a speed control system for a doubly fed induction generator (DFIG) based wind turbine generator system (DFIG-WTGS). The system of the present disclosure, particularly, investigates a speed control of a wound rotor induction generator, which is otherwise known as the DFIG. The system includes a voltage source converter (VSC) having a rotor side converter (RSC) connected to the generator and a grid side converter (GSC) connected to a power grid. A VSC controller is provided to control the RSC and the GSC, and applies a nonsingular fast terminal sliding mode control (NSFTSMC) scheme at the RSC based on wind profile to stabilize a rotor speed of the generator. The NSFTSMC is applied to enhance relatively slow responses and sustained oscillations under transient operation found with the conventional proportional-integral (PI) control. The scheme further exhibits faster convergence, robustness, and better transient and steady-state behavior than the PI control. Further, the scheme of the present disclosure is applied in speed loop of rotor side vector control of the DFIG which results in less speed fluctuation with a change in wind speed by controlling a torque component of current $i^*_q$. The scheme further enhances the DFIG operation in terms of mechanical stability and suppression of speed fluctuations. The stability analysis of the methodology ensures the practical finite time stability of the overall system.

Referring to FIG. 1, a schematic block diagram of a doubly fed induction generator (DFIG) based wind turbine generator system (DFIG-WTGS) is shown. Particularly, a DFIG speed control system 100 is illustrated in FIG. 1, according to an embodiment of the present disclosure. Hereinafter, the DFIG speed control system 100 is alternatively referred to as 'the speed control system 100' or 'the system 100' for illustration purpose of the present disclosure. The system 100 includes a wind turbine 102 configured to generate electricity from wind energy along with various components described herein below. The wind turbine 102 includes two to three blades 104 connected to a rotor 106. The blades 104 are positioned based on a wind flow direction such that wind flows across the blades 104, and air pressure on one side of the blades 104 decreases. Difference in air pressure across two sides of the blades 104 creates both lift and drag. The force of the lift is stronger than the drag which causes the rotor 106 to spin.

Figure 2A:
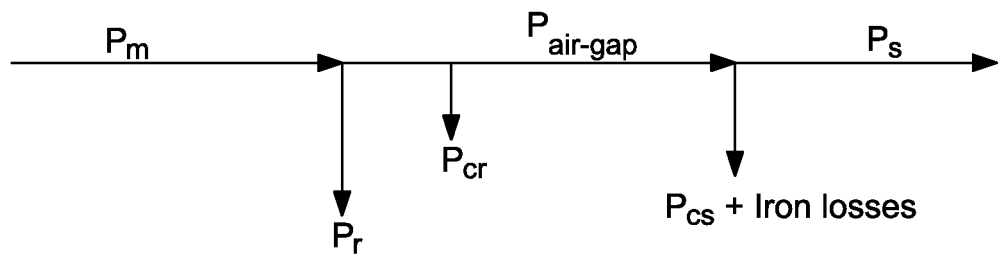
FIG. 2A is a schematic power flow diagram of the DFIG in super-synchronous mode, according to certain embodiments.
Figure 2B:
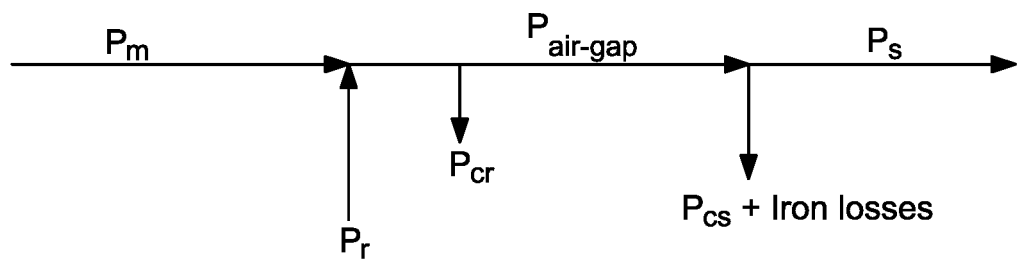
FIG. 2B is a schematic power flow diagram of the DFIG in sub-synchronous mode, according to certain embodiments.

The system 100 further includes a wound rotor induction generator 110, which is alternatively referred to as 'the DFIG 110' or 'the generator 110', configured to connect with the wind turbine 102 through a drive train system 112. The drive train system 112 includes a low-speed shaft 114, a high-speed shaft 116 and a gearbox 118. The low-speed shaft 114 of the drive train system 112 is configured to rotatably connect the rotor 106 of the wind turbine 102 with a low-speed gear 118A of the gearbox 118 and the high-speed shaft 116 of the drive train system 112 is configured to rotatably connect the generator 110 with a high-speed gear 118B of the gearbox 118. The high-speed gear 118B has an outer diameter smaller than an outer diameter of the low-speed gear 118A such that a low rotational speed of the blades 104 of the wind turbine 102 proportionally increases a speed of the high-speed shaft 116 and thereby drive the generator 110 at a speed higher than a speed of the wind turbine 102. The wound rotor induction generator 110 is further configured to connect to a power grid 120. In an embodiment, rotor of the generator 110 either feeds the power grid 120 or takes power into the machine thereby making super-synchronous as well as sub synchronous generation possible as shown in FIG. 2A and FIG. 2B, respectively. The power grid 120 is an interconnected network that delivers electricity from power-producing stations to consumers. The power grid 120 includes various units such as a power generation unit, a power transportation unit for carrying the generated power from the power generation unit to the consumer side, and a substation unit connected to the power transportation unit for receiving the generated power as well as converting into a required power suitable for household or industry loads.

Figure 5A:
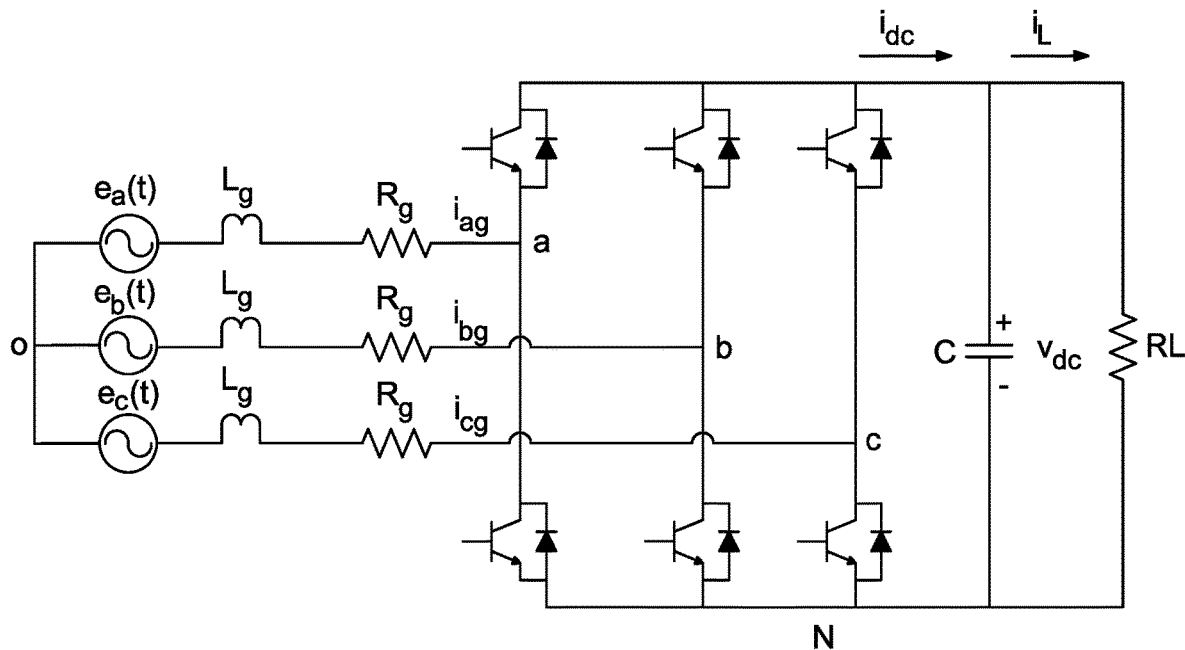
FIG. 5A is a schematic circuit diagram of a voltage source converter (VSC) configuration, according to certain embodiments.

The system 100 further includes a back-to-back voltage source converter (VSC) 122 with a rotor side converter (RSC) 122A and a grid side converter (GSC) 122B. The VSC 122 are self-commutated converters to connect source using devices suitable for high power electronic applications. The VSCs 122 are capable of self-commutation, being able to generate AC voltages without the need to rely on an AC system. An exemplary configuration of the VSC 122 is shown in FIG. 5A. The RSC 122A is connected to the wound rotor induction generator 110 and the GSC 122B is connected to the power grid 120. In some embodiments, the RSC 122A is an AC-to-DC converter and the GSC 122B is a DC-to-AC converter. The RSC 122A and the GSC 122B are collectively referred to as 'the converters 122' and individually referred to as 'the converter 122' unless otherwise specifically mentioned. The power entering the machine is a slip power and as a result, power capacity of the converters 122 is of slip power rating. The back-to-back VSC 122 is employed to control the power entering the machine or leaving it. Moreover, active and reactive power flow from the stator of the machine can be controlled through the RSC 122A and power flow in the rotor side is controlled by the GSC 122B which is achieved by keeping DC-link voltage constant. Thus, the DFIG-WTGS is isolated from the power grid 120 and making them both fluctuation-recumbent to each other.

The system 100 further includes a wind profile sensor 124 configured to measure a wind profile. According to the present disclosure, the measured wind profile includes at least a wind speed. In an embodiment, the wind profile sensor 124 may be positioned in the rotor 106 such that the wind profile sensor 124 is able to detect the speed of the wind. In some embodiments, the wind profile sensor 124 may be disposed within the drive train system 112 to detect and measure the speed of the wind.

The system 100 further includes a VSC controller 126 configured to provide control to the RSC 122A and the GSC 122B. The VSC controller 126 is coupled with the wind profile sensor 124 to receive an input indicative of a speed of the wind. The VSC controller 126 is further configured to apply a nonsingular fast terminal sliding mode control (NSFTSMC) scheme at the RSC 122A at least partially based on the received wind profile, or the wind speed, to stabilize a rotor speed of the wound rotor induction generator 110. The NSFTSMC scheme is expressed as:

$$u = -\frac{a_1}{b}x_2 - \frac{|x_2|^{2-\xi_2}\text{sign}(x_2)}{bc_2\xi_2}(x_2 + c_1\xi_1|x_1|^{\xi_1-1}x_2) - \alpha_1 s - \alpha_2|s|^\beta \text{sign}(s),$$

where u is the control input, $$a_1 = -\frac{B}{J}, b = \frac{k_t k_1}{J},$$

where B is the friction coefficient, J is the moment of inertia, $k_t$ and $k_1$ are gain constants, $\alpha_1 > 0$, $\alpha_2 > 0$, and $\beta \in (0,1)$ is the pitch angle;
  $x_1$ is a first order mechanical dynamic equation $x_1 = \theta^*_r - \theta_r$ where $\theta^*_r$ is the desired angular position and $\theta_r$ is the angular position of the wind turbine;
  $x_2$ is a second order mechanical dynamic equation $$x_2 = -(T_e - T_L)\frac{1}{Js + B}$$

where $T_L$ is the disturbance load torque and $T_e$ is the electromechanical control torque; and
  s is the nonsingular fast terminal sliding surface (NSFTSS) expressed as:

$$s = x_1 + c_1|x_1|^{\xi_1}\text{sign}(x_1) + c_2|x_2|^{\xi_2}\text{sign}(x_2),$$

where $c_1$ and $c_2$ are positive coefficients of NSFTSS $s \in \mathbb{R}$, and $\xi_1$ and $\xi_2$ are the auxiliary state variables of observer where $\xi_2 \in (1, 2)$ and $\xi_1 > \xi_2$.

Figure 5B:
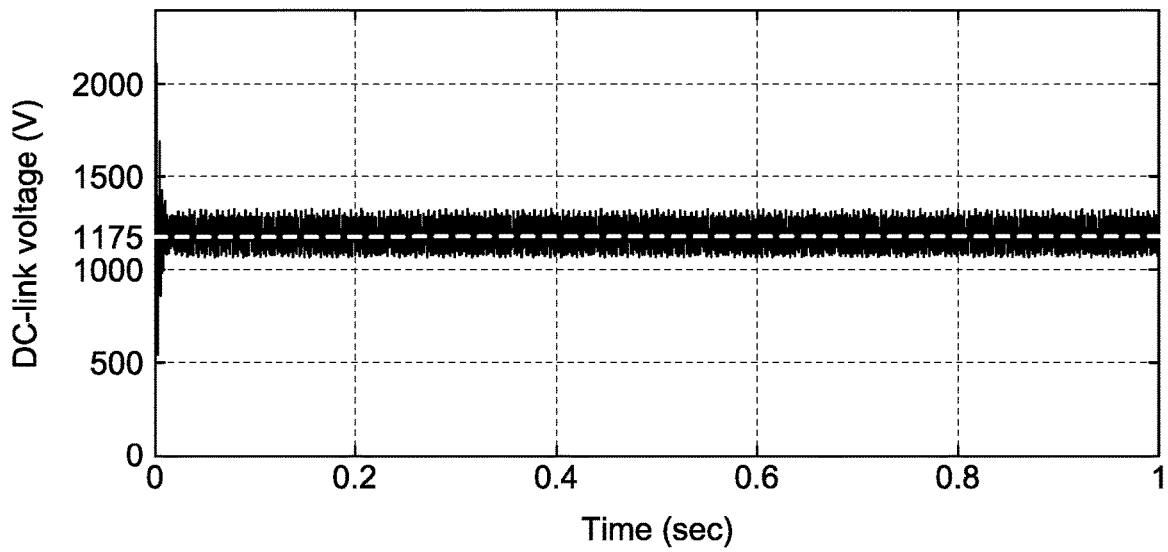
FIG. 5B is a graphical representation showing behavior of DC-link voltage over time, according to certain embodiments.
Figure 5C:
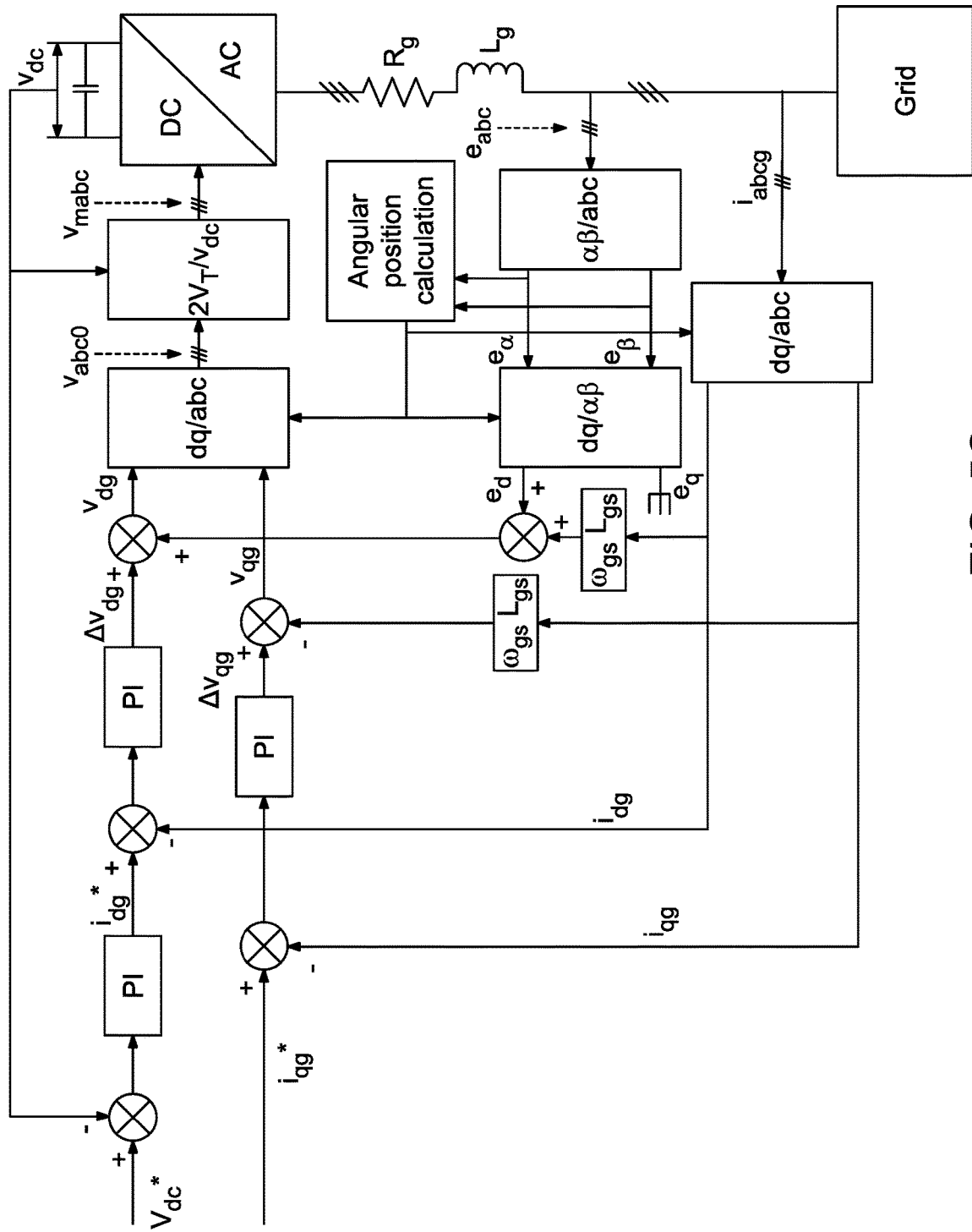
FIG. 5C is a schematic circuit diagram of a grid side control scheme, according to certain embodiments.

In some embodiments, three controls may be required to control the power being fed to the power grid 120. The RSC 122A and GSC 122B employ electrical control schemes (shown in FIG. 5D and FIG. 5C, respectively) where pulse-width modulation (PWM) signals are provided to both the converters 122 and switching angles of insulated-gate bipolar transistors (IGBTs) may be changed with the fluctuation in the DC-link voltage (shown in FIG. 5B). The third control scheme is required to control a pitch of the blades 104 which operates when the wind speed exceeds a rated speed.

Figure 2C:
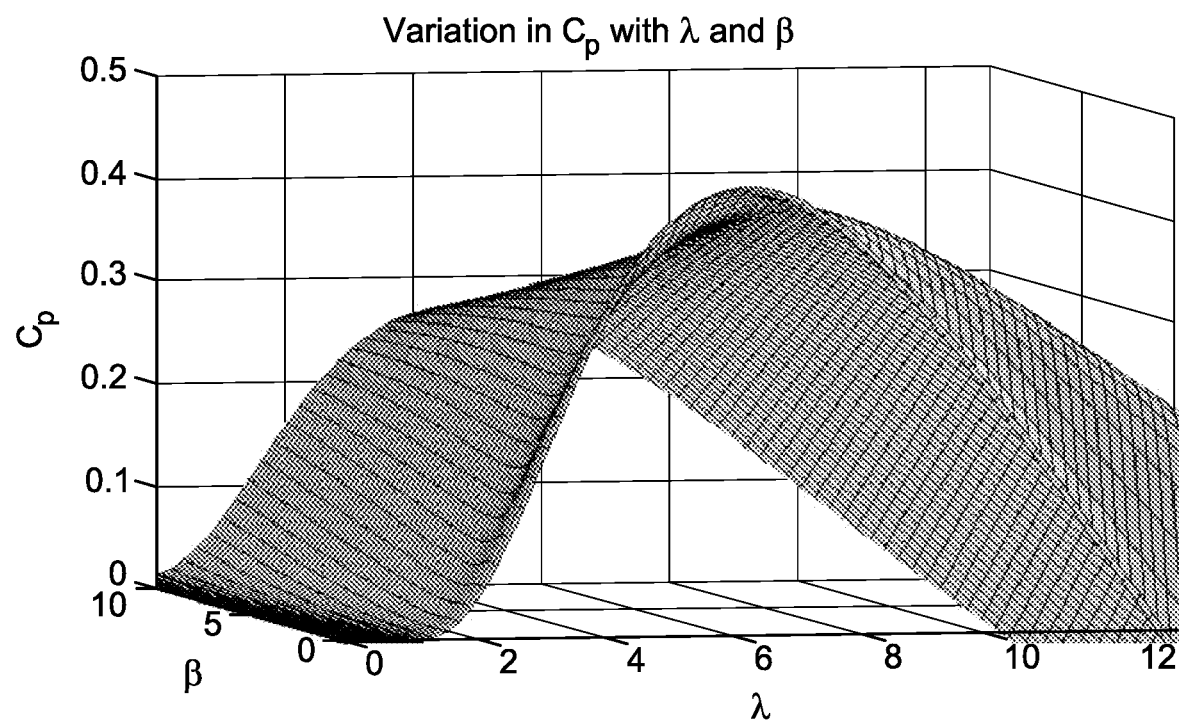
FIG. 2C is a graphical representation showing variations in power coefficient ($c_p$) with speed ratio ($\lambda$) and pitch angle ($\beta$), according to certain embodiments.

The aerodynamics of the wind turbine 102 can be shown by a power coefficient curves, or $C_p$ vs $\lambda$ curves, as shown in FIG. 2C. These can be achieved for different pitch angle ($\beta$) values by using the formulae given by Neto et al. [Neto, A. S., Ferreira, S. L. A., Arruda, J. P., Neves, F. A. S., Rosas, P. A. C. and Cavalcanti, M. C. (2007), "*Reduced Order Model for Grid Connected Wind Turbines with Doubly Fed Induction Generators*", IEEE International Symposium of Industrial Electronics, pp. 2655-2660. —incorporated herein by reference].

$$C_p(\lambda, \beta) = 0.5\left(\frac{116}{\lambda_i} - 0.4*\beta - 5\right)\exp^{-12.5/\lambda_i} \quad (1)$$

where, $$\lambda_i = \left(\frac{1}{\lambda - 0.08*\beta} - \frac{0.035}{\beta^3 + 1}\right)^{-1} \quad (2)$$

$\lambda$ is a tip speed ratio and can be defined as:

$$\lambda = \frac{R*\omega_t}{v_w} \quad (3)$$

where, R is a radius of the wind turbine 102 in meters, $\omega_t$ is a rotational speed of the wind turbine 102 in rad/sec and $v_w$ is a velocity of the wind in m/sec. The maximum mechanical power that can be extracted from the wind, which is given by Ontiveros et al. [Ontiveros, L. J., Mercado, P. E. and Suvire, G. O. (2010), "*A New Model of the Double-Feed Induction Generator Wind Turbine*", 2010 IEEE Transmission and Distribution Conference and Exposition, Latin America, pp. 263-269.—incorporated herein by reference]:

$$P_{wt} = \frac{1}{2}\rho\pi R^2 v_w^3 C_p(\lambda, \beta) \quad (4)$$

where, $\rho$ is the density of the air in kg/m³.

Figure 2D:
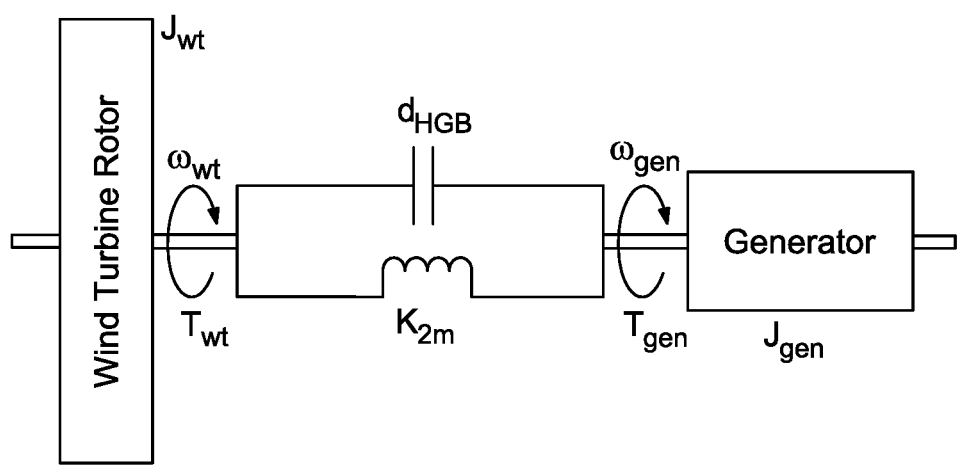
FIG. 2D is a schematic block diagram of a two-mass equivalent of a three-bladed horizontal axis wind turbine generator system, according to certain embodiments.
Figure 2E:
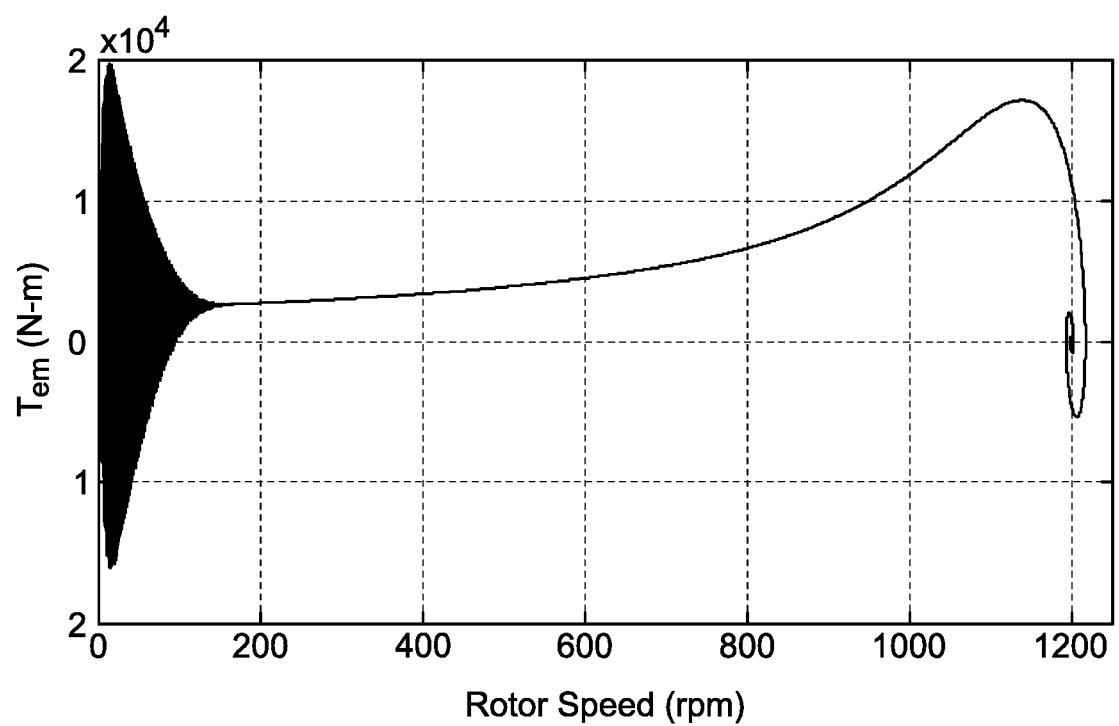
FIG. 2E is a graphical representation showing characteristics of torque vs rotor speed of a 1.5 MVA machine, according to certain embodiments.

Referring to FIG. 2D and FIG. 2E, the equations for the two-mass model is given by Muyeen et. al. [Muyeen, S. M., Ali M. H., Takahashi, R., Murata, T., Tamura, J., Tomaki, Y., Sakahara, A., and Sasano, E. (2007), "*Comparative Study on Transient Stability Analysis of Wind Turbine Generator System Using Different Drive Train Models*", JET Renewable Power Generation, Vol. 1, No, 2, pp. 131-141.— incorporated herein by reference]:

$$\frac{d\theta_{wt}}{dt} = \omega_{wt} \quad (5)$$

$$\frac{d\theta_G^{2m}}{dt} = \omega_G^{2m} \quad (6)$$

$$\frac{d\omega_{wt}}{dt} = \left(T_{wt} - K_{2m}(\theta_{wt} - \theta_G^{2m}) - d_{2m}(\omega_{wt} - \omega_G^{2m}) - D_{wt}\omega_{wt}\right)/J_{wt} \quad (7)$$

$$\frac{d\omega_{wt}^{2m}}{dt} = \left(K_{2m}(\theta_{wt} - \theta_G^{2m}) + d_{2m}(\omega_{wt} - \omega_G^{2m}) - D_G^{2m}\omega_G^{2m}\right)/J_G^{2m} \quad (8)$$

where, $$\frac{1}{K_{2m}} = \frac{1}{(K_{HGB}/N_{GB}^2)} + \frac{1}{K_{GBG}} \quad (9)$$

$$D_G^{2m} = D_G + D_{GB} \quad (10)$$

$$J_G^{2m} = J_G + J_{GB} \quad (11)$$

where, $\theta_{wt}$, $\theta_G{}^{2m}$ are the angular position of the wind turbine 102 and equivalent angular position of generator-gearbox system, respectively. $\omega_{wt}$, $\omega_G{}^{2m}$ are the angular velocity of the wind turbine 102 and equivalent generator-gearbox system angular velocity, respectively. $D_G$ and $D_{GB}$ are self-damping torques of the generator 110 and the gearbox 118, respectively. $J_G$ and $J_{GB}$ are generator and gearbox inertias, respectively. $K_{HGB}$ and $K_{GBG}$ represent the elasticity between hub and the gearbox 118, and the gearbox 118 and the generator 110, respectively. $J_{wt}$, $D_{wt}$ and $T_{wt}$ are the inertia, damping coefficient and the aerodynamic torque acting on the wind turbine 102. These quantities include the three blades 104 and the hub. $N_{GB}$ is the gear ratio. $d_{HGB}$ is hub and the gearbox mutual damping. Custom wind turbine aerodynamic and the drive train models are taken for the purpose of simulation of the system 100.

The Application of Nonsingular Fast Terminal Sliding Mode Control in DFIG control:

The rotor side vector control of the DFIG 110 using the nonsingular fast terminal sliding mode control (NSFTSMC) is illustrated. Before discussing the control design part, the dynamic model of vector drive of the DFIG 110 is considered. Therefore, a first order mechanical dynamic equation considers $x_1 = \theta^*_r - \theta_r$, where $\theta^*_r$ is the desired angular position and $\theta_r$ is the angular position of the wind turbine 102. Taking the time derivative of $x_1$ yields $$\dot{x}_1 = \dot{\theta}^*_r - \dot{\theta}_1 = \omega^*_m - \omega_m = x_2 \tag{12}$$

Further, the second order mechanical dynamic equation of the DFIG 110 can be written in Laplace domain as given by Zadehbagheri, et al. [Zadehbagheri, M., Ildarabadi, R., & Nejad, M. B. (2013). *Sliding mode control of a doubly-fed induction generator (DFIG) for wind energy conversion system*. International Journal of Scientific & Engineering Research, 4(11), 1573-1581—incorporated herein by reference]

$$x_2 = -(T_e - T_L)\frac{1}{Js + B} \tag{13}$$

where J is the moment of inertia, B is the friction coefficient, $T_L$ is the disturbance load torque and $T_e$ is the electromechanical control torque, which is expressed as:

$$T_e = k_t i_{qs} = k_t k_1 u \tag{14}$$

where $k_t$ and $k_1$ are the gain constants, $i_{qs}$ is the stator current component in the q reference frame, and u is the control input, which is to be designed. Substituting (14) in (13) and converting it into time domain as:

$$\dot{x}_2 = -\frac{B}{J}x_2 - \frac{k_t k_1}{J}u + \frac{1}{J}T_L \tag{15}$$

Equations (12) and (15) are the state space equations that can be rewritten in a simplified form as $$\dot{x}_1 = x_2 \tag{16}$$

$$\dot{x}_2 = a_1 x_2 - bu + T_d \tag{17}$$

where $$a_1 = -\frac{B}{J}, b = \frac{k_t k_1}{J} > 0, T_d = \frac{1}{J}T_L.$$

The following assumptions and lemma are used for the stability proof.

Condition 1: The load disturbance is bound such that $\|T_d\| \leq \overline{T} > 0$.

Lemma 1: Fu et al. [Fu, C., Wang, Q. G., Yu, J., & Lin, C. (2021). *Neural network-based finite-time command filtering controlfor switched nonlinear systems with backlash-like hysteresis*. IEEE Transactions on Neural Networks and Learning Systems, 32(7), 3268-3273. —incorporated herein by reference] considers a continuous system $\dot{x} = f(x) \in \mathbb{R}^n$ with $x_0 \in \mathbb{R}^n$ being the equilibrium point and $t_0$ is the initial time. Suppose a positive definite Lyapunov function $V(x) \in \mathbb{R}$ holds the inequality (18) for $\alpha > 0$, $\beta > 0$, $\gamma \in (0,1)$, and $\delta \in (0, +\infty)$ $$\dot{V}(x) \leq -\alpha V(x) - \beta V^\gamma(x) + \delta \tag{18}$$

then, the solution of system $\dot{x} = f(x)$ is practically finite time stable. The settling time and residual bound of V(x) is given by $$T_{settling} \leq \max\left\{t_0 + \frac{1}{\zeta_0 \alpha(1-\gamma)} \ln\left(\frac{\zeta_0 \alpha V^{1-\gamma}(t_0) + \beta}{\beta}\right), \right. \tag{19}$$

$$\left. t_0 + \frac{1}{\alpha(1-\gamma)} \ln\left(\frac{\alpha V^{1-\gamma}(t_0) + \zeta_0 \beta}{\zeta_0 \beta}\right)\right\}$$

$$\lim_{t \to T_{settling}} |V(x) \leq \min\left\{\frac{\delta}{(1-\zeta_0)\alpha}, \left(\frac{\delta}{(1-\zeta_0)\beta}\right)^{\frac{1}{\gamma}}\right\} \tag{20}$$

where $\zeta \in (0,1)$.

Proof of the controller design and its stability analysis:

The control scheme is based on the nonsingular fast terminal sliding surface (NSFTSS). The structure of the surface is inspired from Amrr et al. [Amrr, S. M., & Nabi, M. (2020). "*Finite-time fault tolerant attitude tracking control of spacecraft using robust nonlinear disturbance observer with anti-unwinding approach*", Advances in Space Research, 66(7), 1659-1671. —incorporated herein by reference] and defined as:

$$s = x_1 + c_1 \lfloor x_1 \rceil^{\xi_1} + c_2 \lfloor x_2 \rceil^{\xi_2} \tag{21}$$

where $\lfloor x_1 \rceil^{\xi_1} = |x_1|^{\xi_1} \text{sign}(x_1)$, $c_1$ and $c_2$ are positive coefficients of NSFTSS $s \in \mathbb{R}$,, $\xi_1$ and $\xi_2$ are the auxiliary state variables of observer, and $\xi_2 \in (1, 2)$ and $\xi_1 > \xi_2$. The time derivative of s yields $$\dot{s} = \dot{x}_1 + c_1 \xi_1 |x_1|^{\xi_1 - 1} \dot{x}_1 + c_2 \xi_2 |x_2|^{\xi_2 - 1} \dot{x}_2 \tag{22}$$

$$\dot{s} = x_2 + c_1 \xi_1 |x_1|^{\xi_1 - 1} x_2 + c_2 \xi_2 |x_2|^{\xi_2 - 1} (a_1 x_2 - bu + T_d) \tag{23}$$

In view of the derivative of s from (23), the nonsingular fast terminal SMC (NSFTSMC) algorithm is defined as $$u = u_o + u_s \tag{24}$$

where $u_0$ is the nominal component and $u_s$ is the discontinuous component, and they are expressed as $$u_o = -\frac{a_1}{b}x_2 - \frac{\lfloor x_2 \rceil^{2-\xi_2}}{bc_2 \xi_2}(x_2 + c_1 \xi_1 |x_1|^{\xi_1 - 1} x_2) \tag{25}$$

and $$u_s = -\alpha_1 s - \alpha_2 \lfloor s \rceil^\beta \tag{26}$$

where $\alpha_1 > 0$, $\alpha_2 > 0$, and $\beta \in (0,1)$.

Considering the sliding dynamics (23) and the NSFTSMC law (18) under Condition 1. The action of the disclosed methodology will achieve the practical finite time stability and the sliding surface s will converge to a small residual bound of zero. Moreover, the relative states $x_1$ and $x_2$ will also converge to the vicinity of origin in the sense of practical finite time stability.

Consider a Lyapunov function $$V = \frac{1}{2}s^2 \qquad (27)$$

The time derivative of V gives $$\dot{V} = s\dot{s} \qquad (28)$$

$$\dot{V} = s(x_2 + c_1\xi_1|x_1|^{\xi_1-1}x_2 + c_2\xi_2|x_2|^{\xi_2-1}(a_1x_2 - bu + T_d)) \qquad (29)$$

Substituting the control law u from (21) and (22) into (29) yields $$\dot{V} = s(-\alpha_1 s - \alpha_2 \lfloor s \rceil^\beta + T_d c_2 \xi_2 |x_2|^{\xi_2-1}) \qquad (30)$$

$$\dot{V} \leq -\alpha_1 \|s\|^2 - \alpha_2 \|s\|^{\beta+1} \eta \|T_d\| \|s\| \qquad (31)$$

$$\dot{V} \leq -\alpha_1 \|s\|^2 - \alpha_2 \|s\|^{\beta+1} + \eta \bar{T} \|s\| \qquad (32)$$

where $\eta = \max(c_2 \, \xi_2|x_2|^{\xi_2-1}) \geq 0$, which is a lumped value. Now, using completing the square technique Amrr et al. [Amrr, S. M., & Nabi, M. (2019), "*Attitude stabilization of flexible spacecraft under limited communication with reinforced robustness*" Transactions of the Institute of Measurement and Control, 41(16), 4475-4487.—incorporated herein by reference] by introducing a constant K such that $0 < \kappa < \alpha_1$. Further, adding and subtracting a term $$\frac{(\eta \bar{T})^2}{4\kappa}$$

in (32) as.

$$\dot{V} \leq (\alpha_1 - \kappa)\|s\|^2 - \left(\kappa\|s\|^2 - \eta\bar{T}\|s\| + \frac{(\eta\bar{T})^2}{4\kappa}\right) - \alpha_2\|s\|^{\beta+1} + \frac{(\eta\bar{T})^2}{4\kappa} \qquad (33)$$

$$\dot{V} = -(\alpha_1 - \kappa)\|s\|^2 - \left(\sqrt{\kappa}\|s\| - \frac{\eta\bar{T}}{2\sqrt{\kappa}}\right)^2 - \alpha_2\|s\|^{\beta+1} + \frac{(\eta\bar{T})^2}{4\kappa}$$

$$\dot{V} \leq -\alpha_{1\kappa}\|s\|^2 - \alpha_2\|s\|^{\beta+1} + \Delta$$

$$\dot{V} \leq -2\alpha_{1\kappa}\frac{1}{2}s^2 - \alpha_2 2^{\frac{\beta+1}{2}}\left(\frac{1}{2}s^2\right)^{\frac{\beta+1}{2}} + \Delta$$

$$\dot{V} \leq -2\alpha_{1\kappa}V - \alpha_2 2^{\frac{\beta+1}{2}} V^{\frac{\beta+1}{2}} + \Delta \qquad (34)$$

$$\dot{V} \leq -\bar{\alpha}_1 V - \bar{\alpha}_2 V^{\beta'} + \Delta \text{ where}$$

$$\alpha_{1\kappa} = (\alpha_1 - \kappa) > 0, \Delta = \frac{(\eta\bar{T})^2}{4\kappa} > 0,$$

$$\bar{\alpha}_1 = 2\alpha_{1\kappa} > 0, \bar{\alpha}_2 = 2^{\frac{\beta+1}{2}}\alpha_2 > 0, \beta' = \frac{\beta+1}{2} < 1.$$

Considering Lemma 1, Equation (34) satisfies the practical finite time stability condition. Therefore, sliding surface s will converge to the narrow bound of zero as defined in Equation (19) and the settling time as (20). Moreover, the relative states $x_1$ and $x_2$ will also converge to the uniformly ultimate bound within finite time (i.e., practical finite time stable). This convergence proof is not presented here due to brevity and word limitation. However, the similar proof can be seen from Amrr et al. [Amrr, S. M., & Alturki, A. (2021), "*Robust Control Design for an Active Magnetic Bearing System Using Advanced Adaptive SMC Technique*" IEEE Access, 9, 155662-155672.—incorporated herein by reference].

Figure 3:
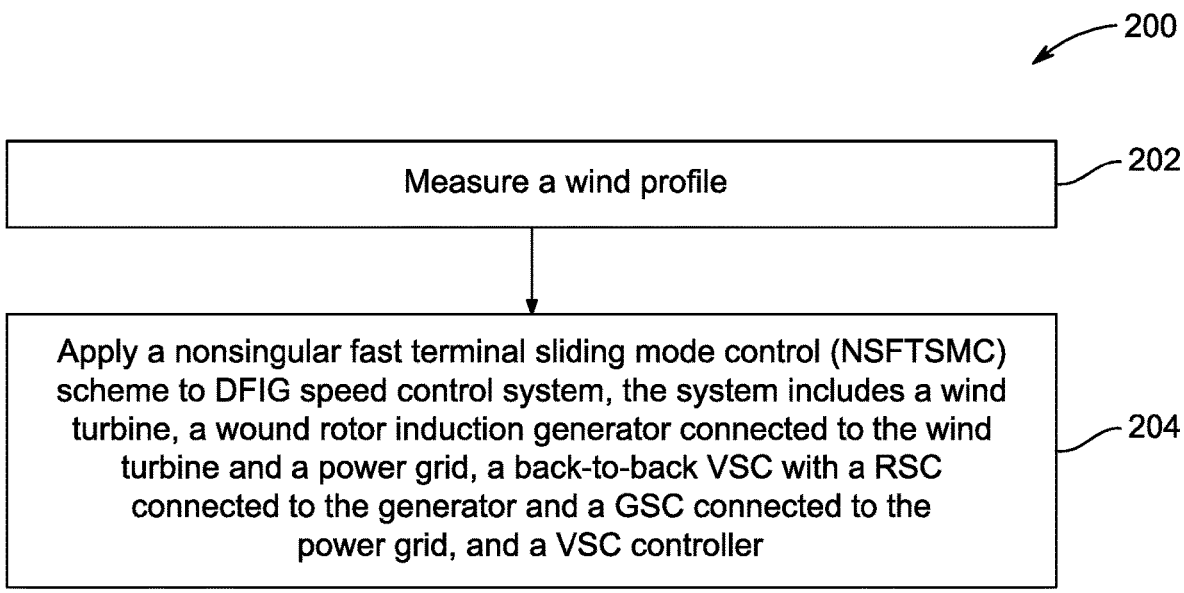
FIG. 3 is a schematic flow diagram of a method for controlling the doubly fed induction generator (DFIG) speed control system, according to one embodiment.

Referring to FIG. 3, a schematic flow diagram of a method 200 for controlling the DFIG speed control system 100 is illustrated, according to an embodiment of the present disclosure. At step 202, the method 200 includes measuring the wind profile. In some embodiments, the wind profile at least includes the wind speed. The wind profile sensor 124 disposed on the rotor 106 or the blades 104 may detect the wind profile. Further, the wind profile sensor 124 may communicate the input signal indicative of the wind profile, or the wind speed, with the VSC controller 126 such that the VSC controller 126 may process the input signals to measure the wind speed.

At step 204, the method 200 includes applying the nonsingular fast terminal sliding mode control (NSFTSMC) scheme to the DFIG speed control system 100. The DFIG speed control system 100 includes the wind turbine 102 and the wound rotor induction generator 110. The generator 110 is configured to connect with the wind turbine 102 through the drive train system 112 and connect to the power grid 120. The drive train system 112 in the DFIG based wind turbine generator system further includes the low-speed shaft 114, the high-speed shaft 116, and the gearbox 118. The system 100 further includes the back-to-back VSC 122 including the RSC 122A and the GSC 122B. In some embodiments, the RSC 122A is the AC-to-DC converter and the GSC 122B is the DC-to-AC converter. The system 100 further includes the VSC controller 126 in communication with the RSC 122A and the GSC 122B. The RSC 122A is connected to the wound rotor induction generator 110 and the GSC 122B is connected to the power grid 120. In some embodiments, applying the NSFTSMC scheme is done by the VSC controller 126 to the RSC 122A to stabilize the rotor speed of the wound rotor induction generator. The NSFTSMC scheme is expressed as:

$$u = -\frac{a_1}{b}x_2 - \frac{|x_2|^{2-\xi_2}\text{sign}(x_2)}{bc_2\xi_2}(x_2 + c_1\xi_1|x_1|^{\xi_1-1}x_2) - \alpha_1 s - \alpha_2|s|^\beta \text{sign}(s),$$

where u is the control input $$a_1 = -\frac{B}{J}, b = \frac{k_r k_1}{J},$$

where B is the friction coefficient, J is the moment of inertia, $k_r$ and $k_1$ are gain constants, $\alpha_1 > 0$, $\alpha_2 > 0$, and $\beta \in (0,1)$ is the pitch angle;

$x_1$ is a first order mechanical dynamic equation $x_1 = \theta^*_r - \theta_r$ where $\theta^*_r$ is the desired angular position and $\theta_r$ is the angular position of the wind turbine;

$x_2$ is a second order mechanical dynamic equation $$x_2 = -(T_e - T_L)\frac{1}{Js + B}$$

where $T_L$ is the disturbance load torque and $T_e$ is the electromechanical control torque; and s is the nonsingular fast terminal sliding surface (NSFTSS) expressed as:

$$s = x_1 + c_1|x_1|^{\xi_1}\text{sign}(x_1) + c_2|x_2|^{\xi_2}\text{sign}(x_2),$$

where $c_1$ and $c_2$ are positive coefficients of NSFTSS $s \in \mathbb{R}$, and $\xi_1$ and $\xi_2$ are the auxiliary state variables of observer where $\xi_2 \in (1, 2)$ and $\xi_1 > \xi_2$.

In some embodiments, the method 200 includes applying an electrical control scheme to the GSC 122B and applying a rotor blade control scheme to the wind turbine 102 to control a pitch of the rotor blades 104 of the wind turbine 102. The pitch angle of the rotor blades 104 may be defined as angle of blade chord to the plane of rotation. In an example, a pitch control system may be provided in the rotor 106 of the wind turbine 102 and the rotor blade control scheme may be applied to the pitch control system to control the pitch angle of the rotor blades 104.

Figure 4:
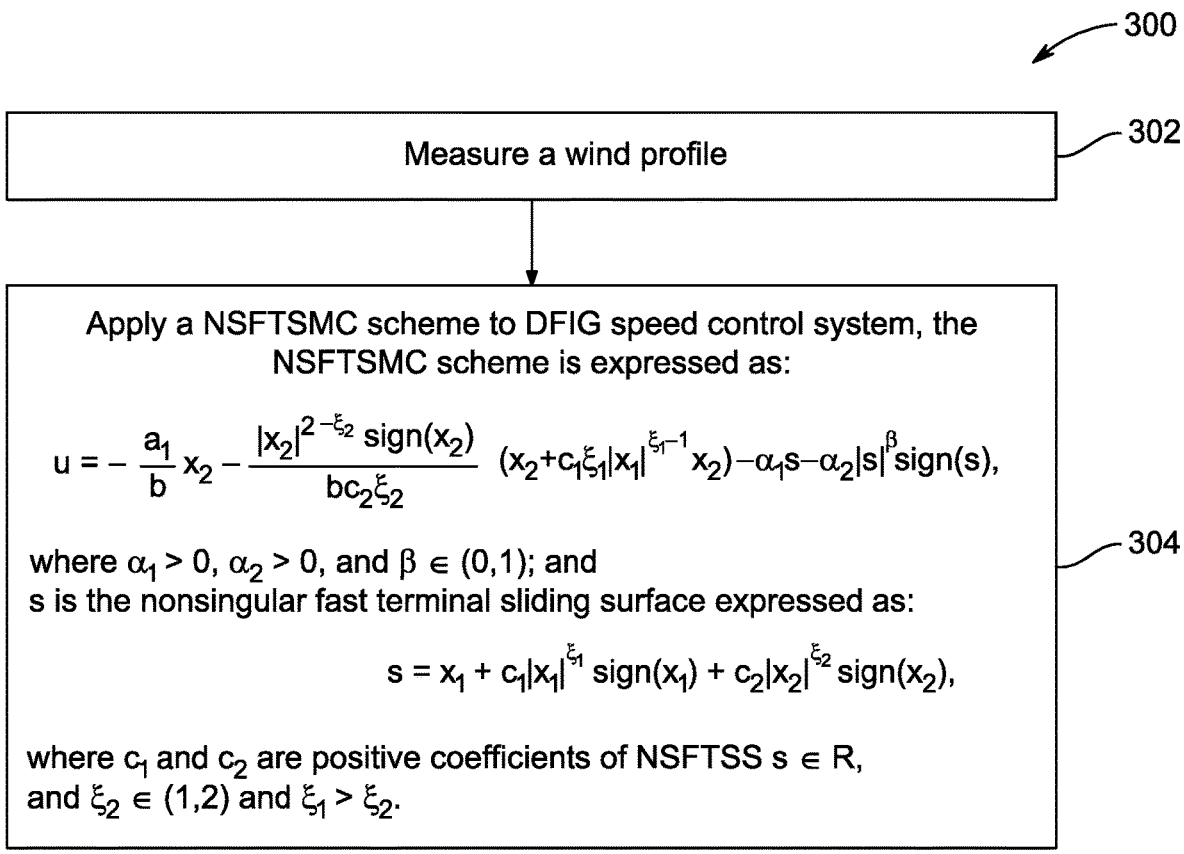
FIG. 4 is a schematic flow diagram of a method for controlling the doubly fed induction generator (DFIG) speed control system, according to another embodiment.

Referring to FIG. 4, a schematic flow diagram of a method 300 for controlling the DFIG speed control system 100 is illustrated, according to an embodiment of the present disclosure. At step 302, the method 300 includes measuring the wind profile. In some embodiments, the measured wind profile at least includes the wind speed. The wind profile sensor 124 and the VSC controller 126 together configured to measure the wind speed.

At step 304, the method 300 includes applying the nonsingular fast terminal sliding mode control (NSFTSMC) scheme to the DFIG speed control system 100. The NSFTSMC scheme is expressed as:

$$u = -\frac{a_1}{b}x_2 - \frac{|x_2|^{2-\xi_2}\text{sign}(x_2)}{bc_2\xi_2}\left(x_2 + c_1\xi_1|x_1|^{\xi_1-1}x_2\right) - \alpha_1 s - \alpha_2 |s|^\beta \text{sign}(s),$$

where u is the control input, $$a_1 = -\frac{B}{J}, b = \frac{k_t k_1}{J},$$

where B is the friction coefficient, J is the moment of inertia, $k_t$ and $k_1$ are gain constants, $\alpha_1 > 0$, $\alpha_2 > 0$, and $\beta \in (0,1)$ is the pitch angle;
  $x_1$ is a first order mechanical dynamic equation $x_1 = \theta^*_r - \theta_r$ where $\theta^*_r$ is the desired angular position and $\theta_r$ is the angular position of the wind turbine;
  $x_2$ is a second order mechanical dynamic equation $$x_2 = -(T_e - T_L)\frac{1}{Js + B}$$

where $T_L$ is the disturbance load torque and $T_e$ is the electromechanical control torque; and
  s is the nonsingular fast terminal sliding surface (NSFTSS) expressed as:

$$s = x_1 + c_1|x_1|^{\xi_1}\text{sign}(x_1) + c_2|x_2|^{\xi_2}\text{sign}(x_2),$$

where $c_1$ and $c_2$ are positive coefficients of NSFTSS $s \in \mathbb{R}$, and $\xi_1$ and $\xi_2$ are the auxiliary state variables of observer where $\xi_2 \in (1, 2)$ and $\xi_1 > \xi_2$.

In some embodiments, the DFIG speed control system 100 includes the wind turbine 102 and the wound rotor induction generator 110. The wind turbine 102 includes the low-speed shaft 114, the high-speed shaft 116, and the gearbox 118. The generator 110 is configured to connect with the wind turbine 102 through the drive train system 112 and connect to the power grid 120. The low-speed shaft 114, the high-speed shaft 116, and the gearbox 118 together constitute the drive trains system 112. The system 100 further includes the back-to-back VSC 122 including the RSC 122A and the GSC 122B. In some embodiments, the RSC 122A is the AC-to-DC converter and the GSC 122B is the DC-to-AC converter. The system 100 further includes the VSC controller 126 in communication with the RSC 122A and the GSC 122B. The RSC 122A is connected to the wound rotor induction generator 110 and the GSC 122B is connected to the power grid 120. In some embodiments, applying the NSFTSMC scheme is done by the VSC controller 126 to the RSC 122A.

Figure 5D:
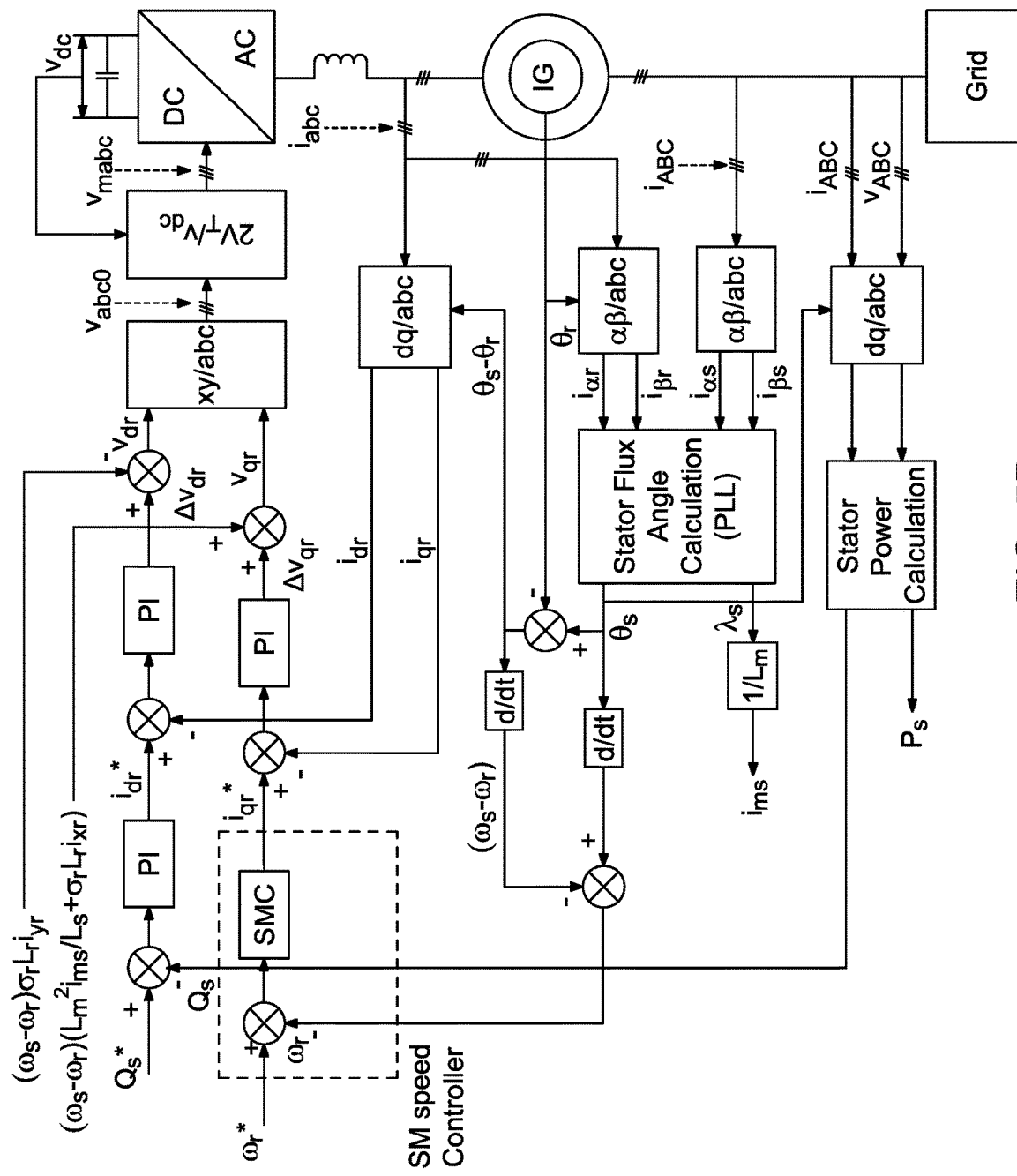
FIG. 5D is a schematic circuit diagram of a rotor side control scheme with sliding mode control (SMC) implementation in a speed control loop, according to certain embodiments.
Figure 6A:
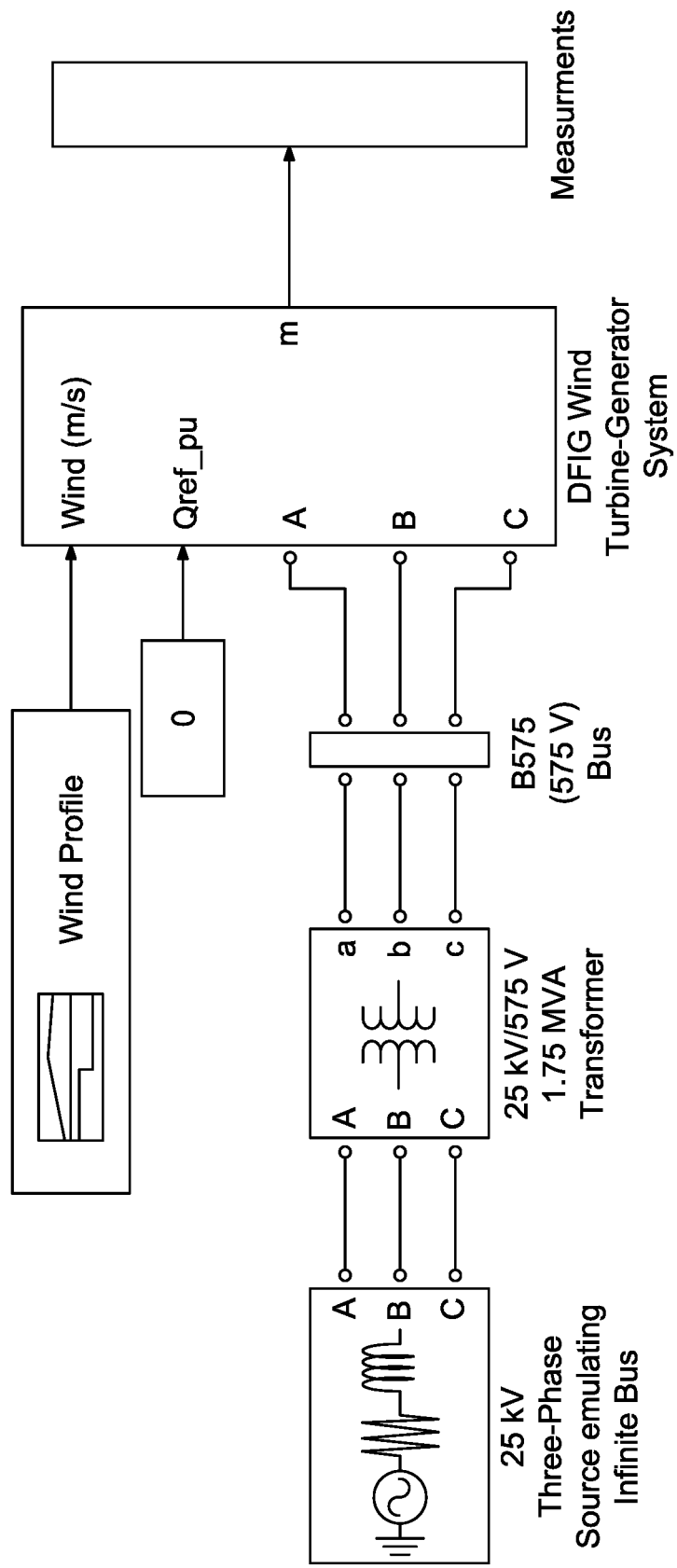
FIG. 6A is a schematic diagram showing the DFIG-WTGS connected to a power grid, according to certain embodiments.
Figure 6B:
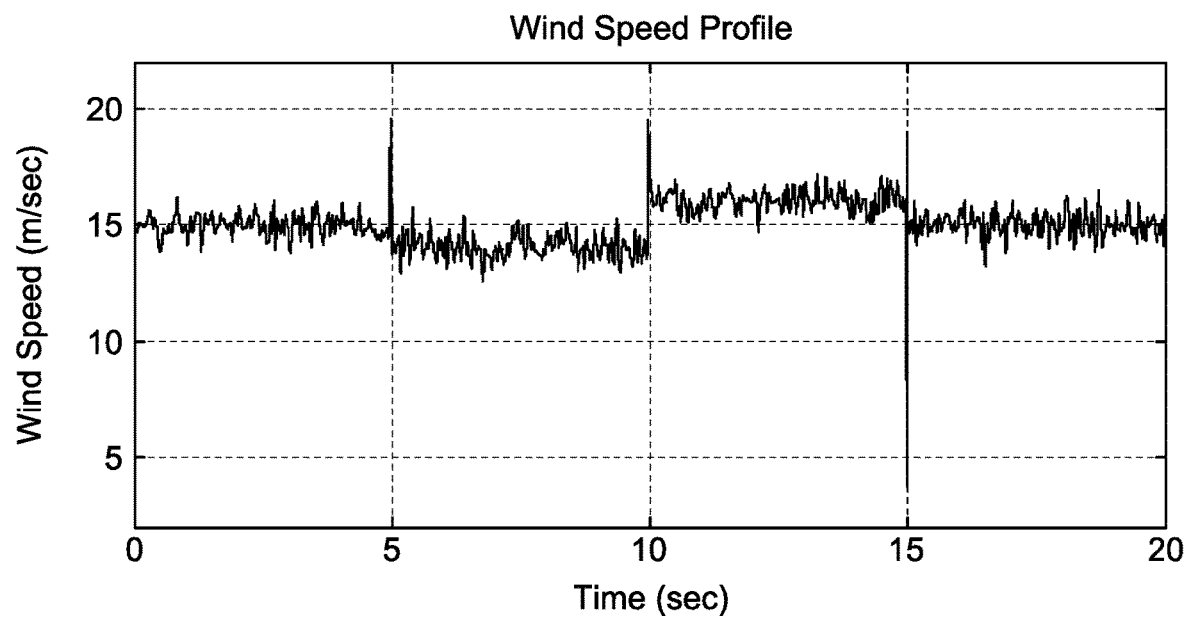
FIG. 6B is a graphical representation showing behavior of wind speed with respect to wind turbine blades over time, according to certain embodiments.

The DFIG 110 with the above-discussed NSFTSMC scheme is implemented on the RSC 122A of the DFIG 110 as shown in FIG. 5D. The system 100 is connected to the power grid 120 as shown in FIG. 6A. The DFIG ratings are taken from the technical report by [Miller, N., Price, W., and Sanchez-Gasca, J. (2003), "*Dynamic modeling of GE 1.5 and 3.6 wind turbine—generators*", General Electric Company, Technical Report—incorporated herein by reference]. The wind is emulated as a sampled Gaussian noise, as discussed by in Patel et al., 2021 [Patel, M. R., Beik, O. (2021), "*Wind and Solar Power Systems: Design, Analysis, and Operation* (3rd ed.)", CRC Press, Florida, USA, ISBN: 9780367476939—incorporated herein by reference]. FIG. 6B shows random behavior of wind. The rated wind speed is 15 m/sec.

Figure 7A:
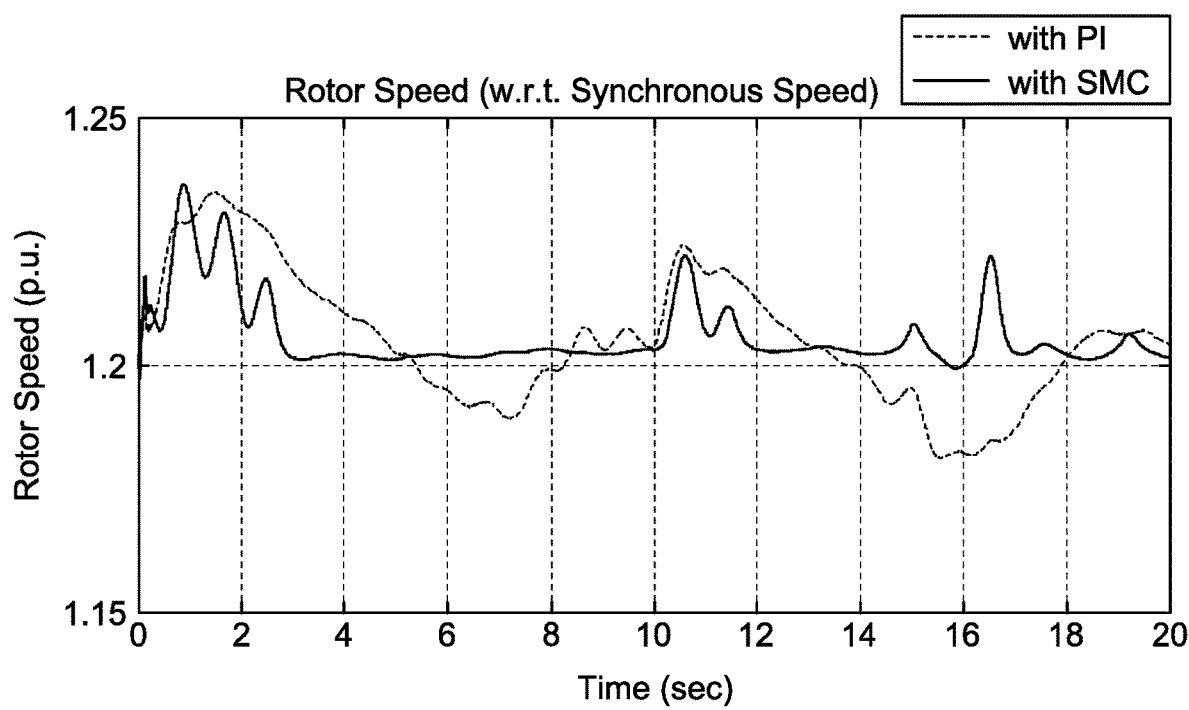
FIG. 7A is a graphical representation showing comparative behavior of the SMC based speed control with respect to a conventional PI control in terms of a rotor speed, according to certain embodiments.

Conventional proportional integral (PI) speed controller and NSFTSMC schemes were implemented, and the performance was compared. The analysis is as follows. The rotor shaft's base speed is 1.2 times the synchronous speed of the machine, which is determined by the frequency of the supply current f and the number of magnetic poles p with a formula of $$N_s = \frac{120f}{p},$$

where $N_s$ is the synchronous speed. The actual rotor shaft speed behavior with both PI and NSFTSMC is shown in FIG. 7A. It can be observed that the rotor speed settles much faster with NSFTSMC than the PI controller when the wind turbine 102 is subjected to a wind speed change, e.g., from 5% to 50% faster, from 10% to 40% faster, from 15 to 30% faster, from 20 to 25% faster, or up to 50% faster. The rotor speed is considered to be stable when the rotor speed is between 1.195 and 1.205 times the synchronous speed of the machine. The compared settling performance is calculated as the difference of the settling time between the NSFTSMC and the PI controller divided by the settling time of the PI controller in percentage, i.e., $$\frac{T_{NSFTSMC\ settling} - T_{PI\ settling}}{T_{PI\ settling}} \times 100\%.$$

Figure 7B:
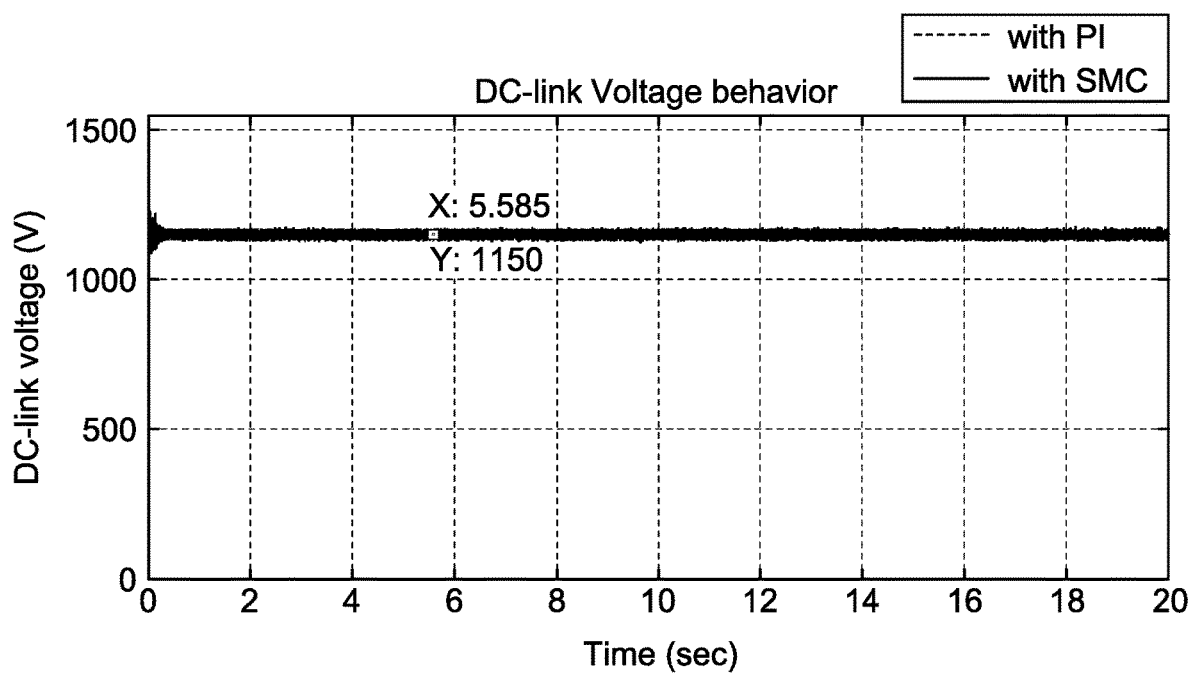
FIG. 7B is a graphical representation showing comparative behavior of the SMC based speed control with respect
Figure 7C:
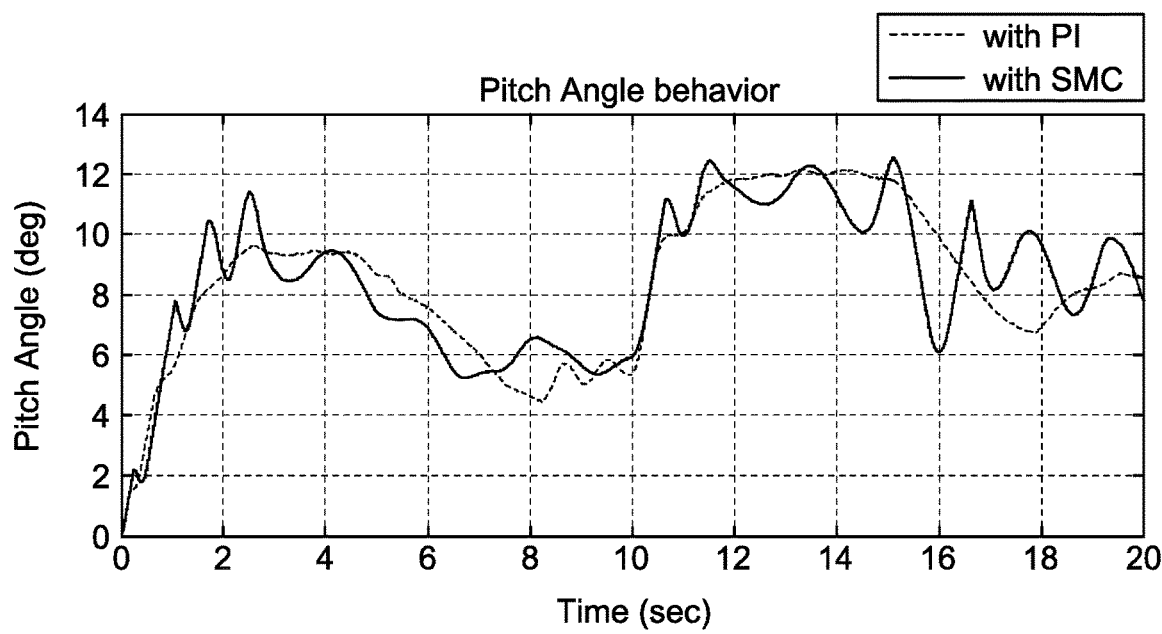
FIG. 7C is a graphical representation showing comparative behavior of the SMC based speed control with respect to a conventional PI control in terms of pitch angle, according to certain embodiments.
Figure 7D:
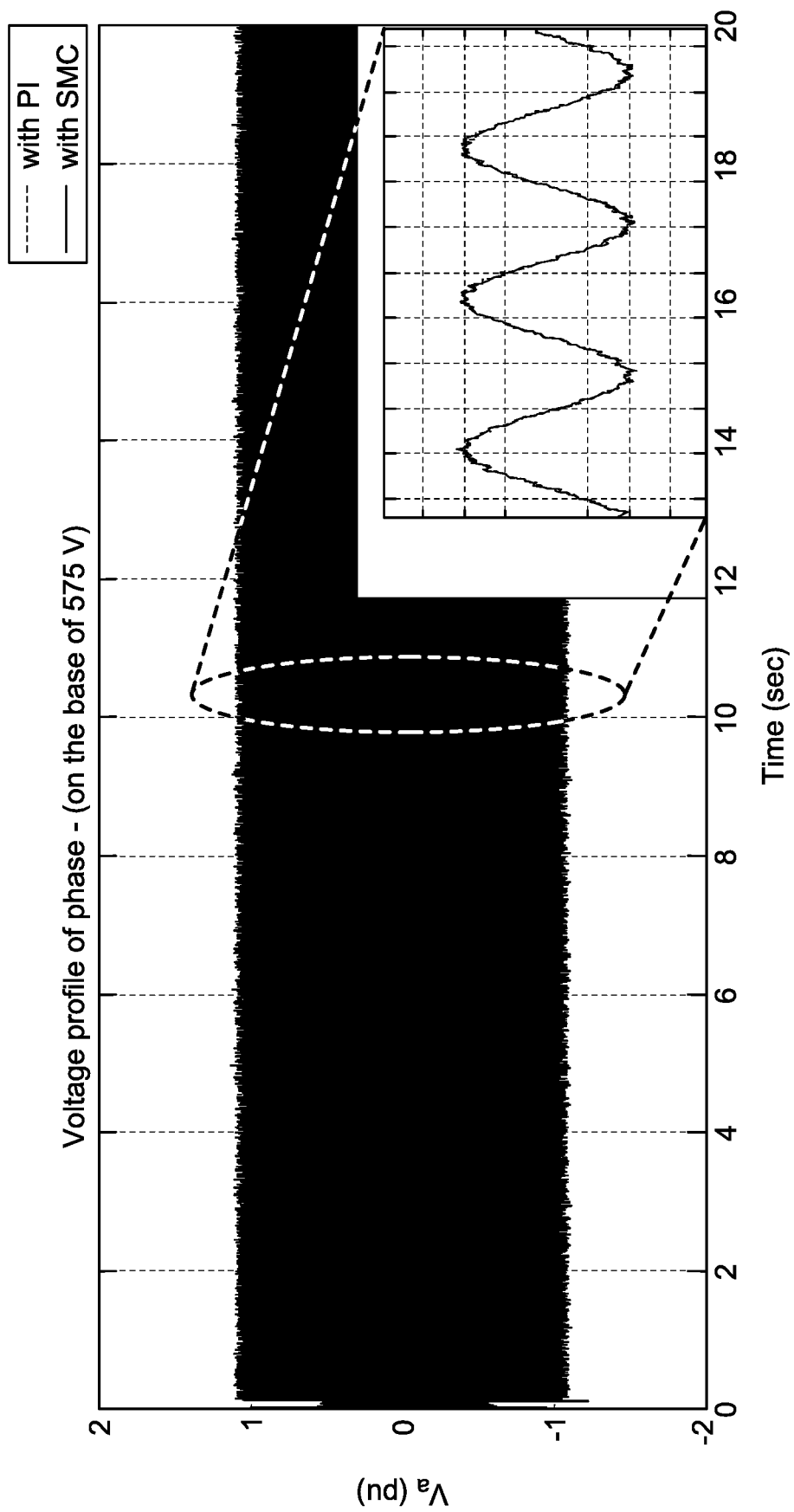
FIG. 7D is a graphical representation showing comparative behavior of the SMC based speed control with respect to a conventional PI control in terms of voltage profile of phase-A, according to certain embodiments.
Figure 7E:
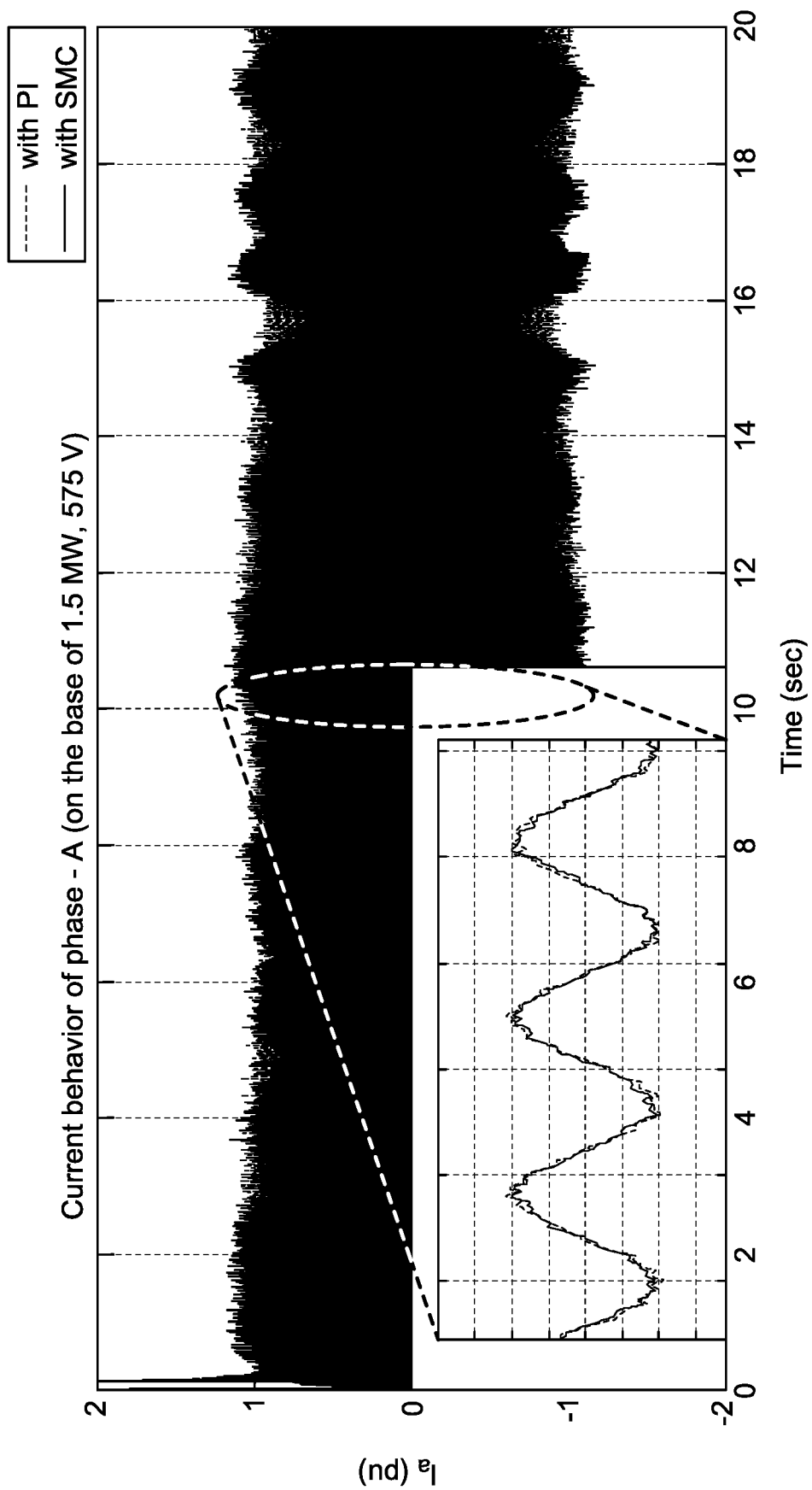
FIG. 7E is a graphical representation showing comparative behavior of the SMC based speed control with respect to a conventional PI control in terms of current profile of phase-A, according to certain embodiments.
Figure 7F:
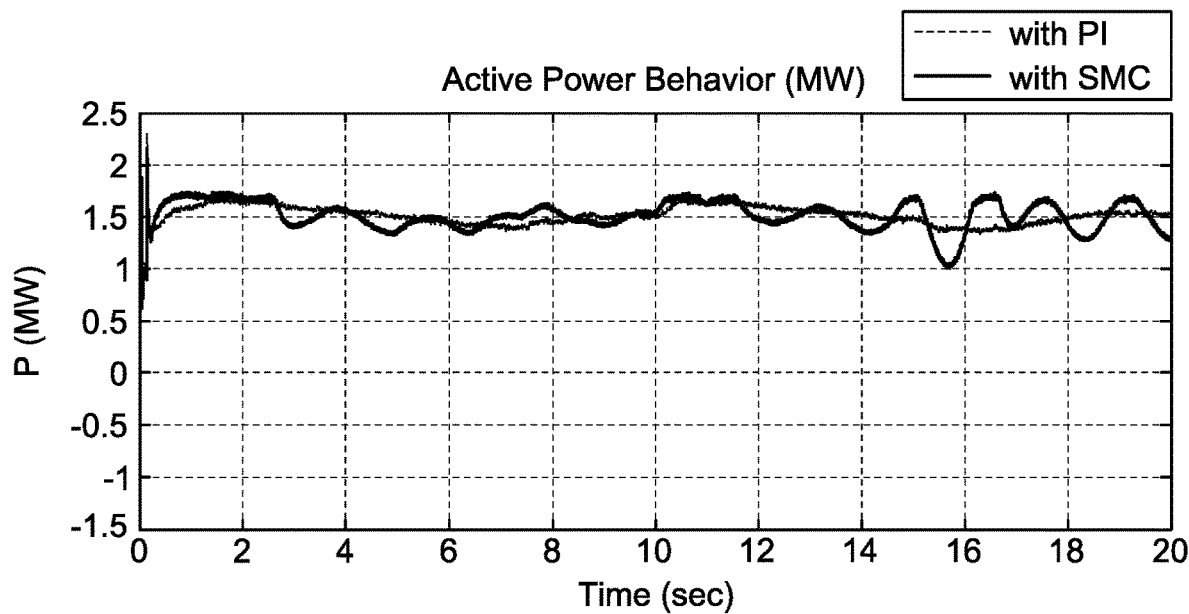
FIG. 7F is a graphical representation showing comparative behavior of the SMC based speed control with respect to a conventional PI control in terms of active power, according to certain embodiments.
Figure 7G:
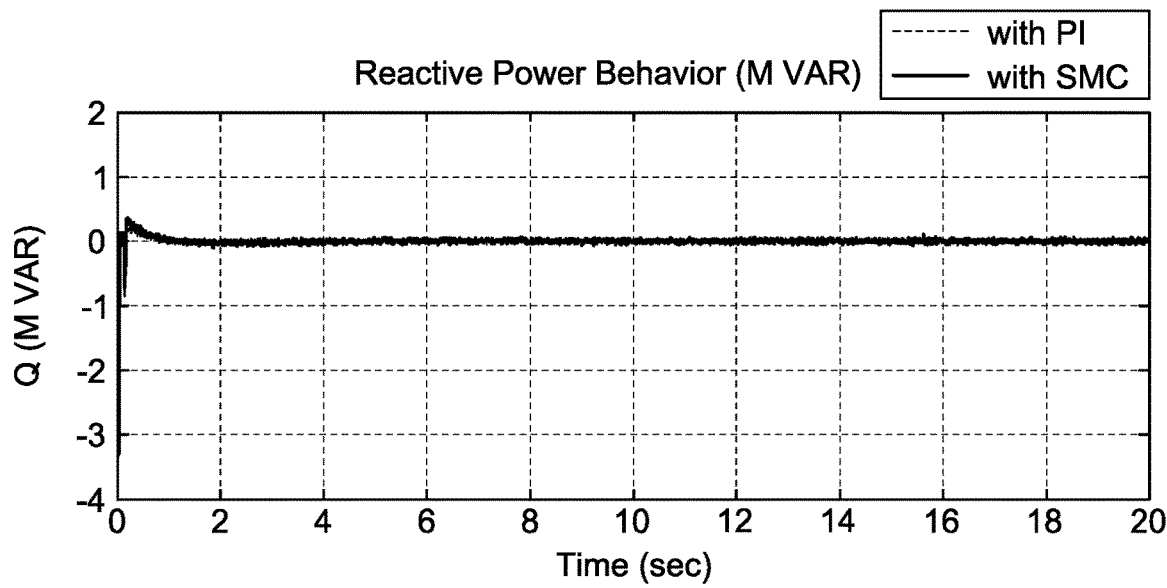
FIG. 7G is a graphical representation showing comparative behavior of the SMC based speed control with respect to a conventional PI control in terms of reactive power, according to certain embodiments.
Figure 7H:
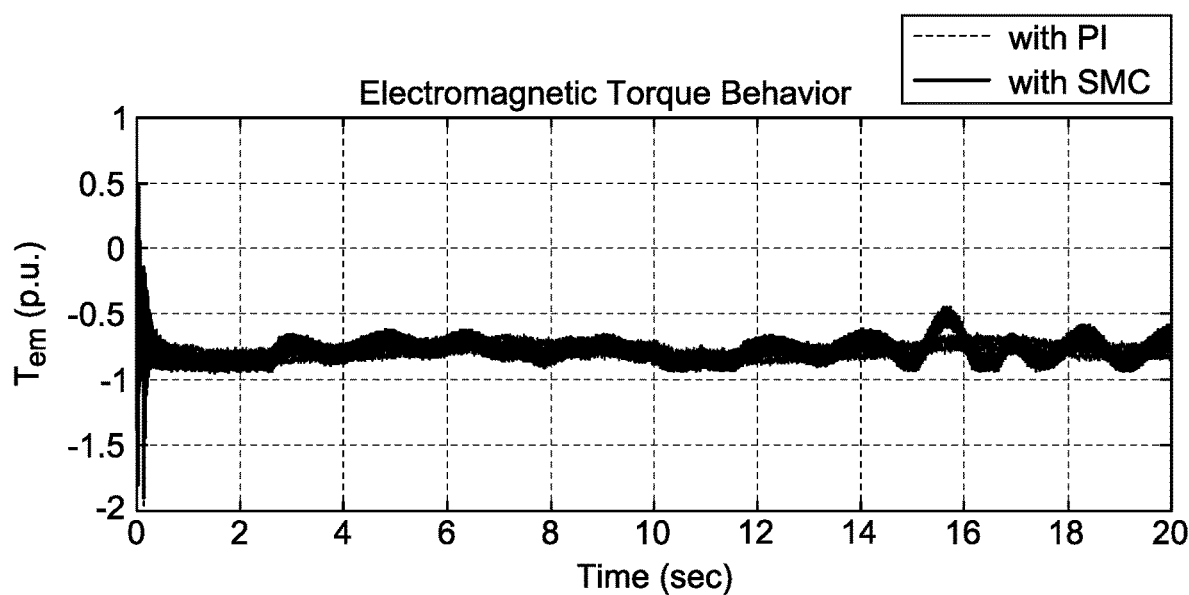
FIG. 7H is a graphical representation showing comparative behavior of the SMC based speed control with respect to a conventional PI control in terms of electromagnetic torque, according to certain embodiments.

After the first wind speed increase around 0-second mark, the rotor speed with NSFTSMC settles around the 3-second mark, while the rotor speed with PI controller settles around the 5-second mark, a 40% decrease in settling time. After the second wind speed increase at the 10-second mark, the rotor speed with NSFTSMC settles around the 12-second mark, while the rotor speed with PI controller settles around the 13.2-second mark, a 37.5% decrease in settling time. After the third wind speed increase at 16-second mark, the rotor speed with NSFTSMC settles round the 17-second mark, while the rotor speed with PI controller settles around the 18-second mark, a 50% decrease in settling time. It is also observed that the speed of the rotor 106 is more stable with the NSFTSMC as compared with the conventional PI control. The NSFTSMC settles the rotor speed back to the rotor shaft's base speed and maintains the rotor speed within the stable range, while the PI controller would sometimes cause the rotor speed to drop out of the stable range after settling. The DC-link voltage remains unaltered with both the control schemes as seen in FIG. 7B. The pitch angle variation (as shown in FIG. 7C), however, is more stable in the case of conventional PI than the NSFTSMC. The grid side voltage performance is shown in FIG. 7D and exhibits similar behavior with both the control schemes. FIG. 7E exhibits the output current of phase A, and it is seen that there are disturbances with the NSFTSMC, and this disturbance is also observed in active power (FIG. 7F) and electromagnetic torque (FIG. 7H). The reactive power behavior of the machine is similar for both machines as exhibited in FIG. 7G.

According to the present disclosure, the NSFTSMC was investigated for the rotor speed control of the doubly fed induction generator (DFIG) 110. The technique was applied in the speed loop of the rotor side vector control of the DFIG 110 which resulted in less speed fluctuation with the change in wind speed, which is maintained by controlling the torque component of the current. This method leads to enhancement of the machine performance by gaining more mechanical stability and suppression of speed fluctuations than the conventional PI-based control.

Numerous modifications and variations of the present disclosure are possible in light of the above teachings. It is therefore to be understood that within the scope of the appended claims, the invention may be practiced otherwise than as specifically described herein.

What is claimed is:

1. A doubly fed induction generator (DFIG) speed control system, comprising:
   a wind turbine;
   a wound rotor induction generator configured to connect with the wind turbine through a drive train system;
   the wound rotor induction generator is further configured to connect to a power grid;
   a back-to-back voltage source converter (VSC) with a rotor side converter (RSC) and a grid side converter (GSC), wherein the RSC is connected to the wound rotor induction generator and the GSC is connected to the power grid;
   a wind profile sensor configured to measure a wind profile; and
   a VSC controller configured to provide control to the RSC and the GSC;
   wherein the VSC controller is configured to apply a nonsingular fast terminal sliding mode control (NSFTSMC) scheme at the RSC at least partially based on the received wind profile to stabilize a rotor speed of the wound rotor induction generator to a base speed and to achieve a shorter stabilizing time than a conventional proportional integral controller;
   wherein the nonsingular fast terminal sliding mode control (NSFTSMC) scheme is expressed as:

$$u = -\frac{a_1}{b}x_2 - \frac{|x_2|^{2-\xi_2}\mathrm{sign}(x_2)}{bc_2\zeta_2}\left(x_2 + c_1\xi_1|x_1|^{\xi_1-1}x_2\right) - \alpha_1 s - \alpha_2|s|^\beta \mathrm{sign}(s),$$

where u is the control input, $$a_1 = -\frac{B}{J}, b = \frac{k_t k_1}{J},$$

where B is the friction coefficient, J is the moment of inertia, $k_t$ and $k_1$ are gain constants, $\alpha_1 > 0$, $\alpha_2 > 0$, and $\beta \in (0,1)$ is the pitch angle;

$x_1$ is a first order mechanical dynamic equation $x_1 = \theta^*_r - \theta_r$, where $\theta^*_r$ is the desired angular position and $\theta_r$ is the angular position of the wind turbine;

$x_2$ is a second order mechanical dynamic equation $$x_2 = -(T_e - T_L)\frac{1}{Js+B}$$

where $T_L$ is the disturbance load torque and $T_e$ is the electromechanical control torque; and s is the nonsingular fast terminal sliding surface (NSFTSS) expressed as:

$s = x_1 + c_1|x_1|^{\xi_1}\mathrm{sign}(x_1) + c_2|x_2|^{\xi_2}\mathrm{sign}(x_2)$, where $c_1$ and $c_2$ are positive coefficients of NSFTSS $s \in \mathbb{R}$ and $\xi_1$ and $\xi_2$ are the auxiliary state variables of observer where $\xi_2 \in (1, 2)$ and $\xi_1 > \xi_2$.

2. The system of claim 1, wherein the drive train system comprises:
   a low-speed shaft;
   a high-speed shaft; and
   a gearbox.

3. The system of claim 1, wherein the RSC is an AC-to-DC converter and the GSC is a DC-to-AC converter.

4. The system of claim 1, wherein the base speed is 1.2 times a synchronous speed of the wound rotor induction generator.

5. The system of claim 1, wherein the measured wind profile includes at least a wind speed.

6. A method for controlling a doubly fed induction generator (DFIG) speed control system, comprising:
   measuring a wind profile; and
   applying a nonsingular fast terminal sliding mode control (NSFTSMC) scheme to the DFIG speed control system, the DFIG speed control system is configured to include:
   a wind turbine;
   a wound rotor induction generator configured to connect with the wind turbine through a drive train system and connect to a power grid;
   a back-to-back voltage source converter (VSC) with a rotor side converter (RSC) and a grid side converter (GSC), wherein the RSC is connected to the wound rotor induction generator and the GSC is connected to the power grid; and
   a VSC controller;
   wherein the NSFTSMC scheme is applied to stabilize a rotor speed of the wound rotor induction generator to a base speed and to achieve a shorter stabilizing time than a conventional proportional integral controller;
   wherein the nonsingular fast terminal sliding mode control (NSFTSMC) scheme is expressed as:

$$u = -\frac{a_1}{b}x_2 - \frac{|x_2|^{2-\xi_2}\mathrm{sign}(x_2)}{bc_2\xi_2}\left(x_2 + c_1\xi_1|x_1|^{\xi_1-1}x_2\right) - \alpha_1 s - \alpha_2|s|^\beta \mathrm{sign}(s),$$

where u is the control input $$a_1 = -\frac{B}{J}, b = \frac{k_t k_1}{J},$$

where B is the friction coefficient, J is the moment of inertia, $k_t$ and $k_1$ are gain constants, $\alpha_1 > 0$, $\alpha_2 > 0$, and $\beta \in (0,1)$ is the pitch angle;

$x_1$ is a first order mechanical dynamic equation $x_1 = \theta^*_r - \theta_r$ where $\theta^*_r$ is the desired angular position and $\theta_r$ is the angular position of the wind turbine;

$x_2$ is a second order mechanical dynamic equation $$x_2 = -(T_e - T_L)\frac{1}{Js + B}$$

where $T_L$ is the disturbance load torque and $T_e$ is the electromechanical control torque; and s is the nonsingular fast terminal sliding surface (NSFTSS) expressed as:

$$s = x_1 + c_1 |x_1|^{\xi_1} \text{sign}(x_1) + c_2 |x_2|^{\xi_2} \text{sign}(x_2),$$

where $c_1$ and $c_2$ are positive coefficients of NSFTSS $s \in \mathbb{R}$ and $\xi_1$ and $\xi_2$ are the auxiliary state variables of observer where $\xi_2 \in (1, 2)$ and $\xi_1 > \xi_2$.

7. The method of claim 6, wherein the base speed is 1.2 times a synchronous speed of the wound rotor induction generator.

8. The method of claim 6, further comprises:
applying an electrical control scheme to the GSC; and
applying a rotor blade control scheme to the wind turbine to control a pitch of rotor blades of the wind turbine.

9. The method of claim 6, wherein the drive train system in the DFIG based wind turbine further comprises:
a low-speed shaft;
a high-speed shaft; and
a gearbox.

10. The method of claim 6, wherein the RSC is an AC-to-DC converter.

11. The method of claim 6, wherein the GSC is a DC-to-AC converter.

12. The method of claim 6, wherein the received wind profile includes at least a wind speed.

13. A method for controlling a doubly fed induction generator (DFIG) speed control system, comprising:
measuring a wind profile; and
applying a nonsingular fast terminal sliding mode control (NSFTSMC) scheme to stabilize a rotor speed of the DFIG to a base speed and to achieve a shorter stabilizing time than a conventional proportional integral controller, wherein the NSFTSMC scheme is expressed as:

$$u = -\frac{a_1}{b}x_2 - \frac{|x_2|^{2-\xi_2}\text{sign}(x_2)}{bc_2\xi_2}\left(x_2 + c_1\xi_1|x_1|^{\xi_1-1}x_2\right) - \alpha_1 s - \alpha_2 |s|^\beta \text{sign}(s),$$

where u is the control input, $$a_1 = -\frac{B}{J}, b = \frac{k_t k_1}{J},$$

where B is the friction coefficient, J is the moment of inertia, $k_t$ and $k_1$ are gain constants, $\alpha_1 > 0$, $\alpha_2 > 0$, and $\beta \in (0,1)$ is the pitch angle;

$x_1$ is a first order mechanical dynamic equation $x_1 = \theta^*_r - \theta_r$ where $\theta^*_r$ is the desired angular position and $\theta_r$ is the angular position of the wind turbine;

$x_2$ is a second order mechanical dynamic equation $$x_2 = -(T_e - T_L)\frac{1}{Js + B}$$

where $T_L$ is the disturbance load torque and $T_e$ is the electromechanical control torque; and s is the nonsingular fast terminal sliding surface (NSFTSS) expressed as:

$$s = x_1 + c_1 |x_1|^{\xi_1} \text{sign}(x_1) + c_2 |x_2|^{\xi_2} \text{sign}(x_2),$$

where $c_1$ and $c_2$ are positive coefficients of NSFTSS $s \in \mathbb{R}$, and $\xi_1$ and $\xi_2$ are the auxiliary state variables of observer where $\xi_2 \in (1, 2)$ and $\xi_1 > \xi_2$.

14. The method of claim 13, wherein the DFIG speed control system is configured to include:
a wind turbine including a low-speed shaft, a high-speed shaft, and a gearbox;
a wound rotor induction generator configured to connect with the wind turbine through a drive train system and connect to a power grid;
a back-to-back voltage source converter (VSC) with a rotor side converter (RSC) and a grid side converter (GSC), wherein the RSC is connected to the wound rotor induction generator and the GSC is connected to the power grid; and
a VSC controller.

15. The method of claim 14, wherein applying the NSFTSMC scheme is done by the VSC controller to the RSC.

16. The method of claim 14, wherein the RSC is an AC-to-DC converter and the GSC is a DC-to-AC converter.

17. The method of claim 13, wherein the base speed is 1.2 times a synchronous speed of the wound rotor induction generator.

18. The method of claim 13, wherein the measured wind profile includes at least a wind speed.

\* \* \* \* \*